US012698001B1

(12) United States Patent
Agarwal et al.

(10) Patent No.: US 12,698,001 B1
(45) Date of Patent: Aug. 4, 2026

(54) AUTONOMOUS VEHICLE PERFORMANCE MODELING BASED ON CONTROLLER ERROR

(71) Applicant: Zoox, Inc., Foster City, CA (US)

(72) Inventors: Kshitij Agarwal, San Mateo, CA (US); Sven Brüggemann, San Francisco, CA (US); Amir Takhmar, Mountain View, CA (US); Pengzhi Tian, Dublin, CA (US)

(73) Assignee: Zoox, Inc., Foster City, CA (US)

( * ) Notice: Subject to any disclaimer, the term of this patent is extended or adjusted under 35 U.S.C. 154(b) by 65 days.

(21) Appl. No.: 18/650,631

(22) Filed: Apr. 30, 2024

(51) Int. Cl.
　　*B60W 60/00* (2020.01)
　　*B60W 50/04* (2006.01)
　　*G07C 5/08* (2006.01)
(52) U.S. Cl.
　　CPC ........ *B60W 60/0015* (2020.02); *B60W 50/04* (2013.01); *G07C 5/0841* (2013.01); *B60W 2554/802* (2020.02)
(58) Field of Classification Search
　　CPC ............. B60W 60/0015; B60W 50/04; B60W 2554/802; G07C 5/0841
　　See application file for complete search history.

(56) References Cited

U.S. PATENT DOCUMENTS

| | | | |
|---|---|---|---|
| 2023/0192128 A1* | 6/2023 | Kurutach | G06V 10/7625 |
| | | | 701/23 |
| 2023/0286536 A1* | 9/2023 | Belman | G01C 21/3415 |
| 2024/0083429 A1* | 3/2024 | Shimizu | G08G 1/09 |
| 2024/0367680 A1* | 11/2024 | Oboril | G06F 11/3684 |

* cited by examiner

*Primary Examiner* — Rami Khatib
(74) *Attorney, Agent, or Firm* — Lee & Hayes, P.C.

(57) ABSTRACT

Data-driven techniques are described herein for determining collision probabilities and/or predicted collision rates associated with vehicle control components used in autonomous vehicles. A performance modeling system may determine a first vehicle-distance-to-object distribution, based on log data captured in real-world driving environments. A second tracking error distribution may be received and/or determined associated with one or more vehicle control components, and the performance modeling system may determine collision probabilities and/or rates associated with the vehicle control components based on the distributions. In various examples, these techniques can be used to determine target error distributions associated with particular vehicle control components and/or particular driving maneuvers, based on overall safety and performance target metrics for an autonomous vehicle. Additionally, these techniques also can be used to predict the overall collision probability metrics for an autonomous vehicle based on tracking error distributions associated with individual vehicle control components.

20 Claims, 10 Drawing Sheets

PLANNED LATERAL
DISTANCE TO
AGENT 310

HEADING ERROR
314

AGENT
308

ACTUAL
VEHICLE
POSITION
306

PLANNED
VEHICLE
POSITION
304

AUTONOMOUS
VEHICLE 102

LATERAL
PROTRUSION
316

PLANNED
TRAJECTORY
302

LATERAL CONTROL
ERROR 312

400

PLANNED LATERAL
DISTANCE TO
AGENT 402

POTENTIAL
COLLISION
406

DISTANCE

LATERAL
PROTRUSION
404

TIME

408

PROBABILITY

LATERAL
PROTRUSION ERROR
DISTRIBUTION 410

LATERAL
AGENT DISTANCE
TO VEHICLE
DISTRIBUTION
412a

LATERAL
AGENT DISTANCE
TO VEHICLE
DISTRIBUTION
412b

COLLISION
PROBABILITY 414a

DISTANCE

COLLISION
PROBABILITY 414b

VELOCITY RANGE: X
LAT ACCEL RANGE: Y
LONG ACCEL RANGE: Z

COLLISION RATE
ASSOCIATED WITH
VEHICLE COMPONENT
714

COLLISION
RATE SAFETY
BENCHMARK 716

900 ⟶

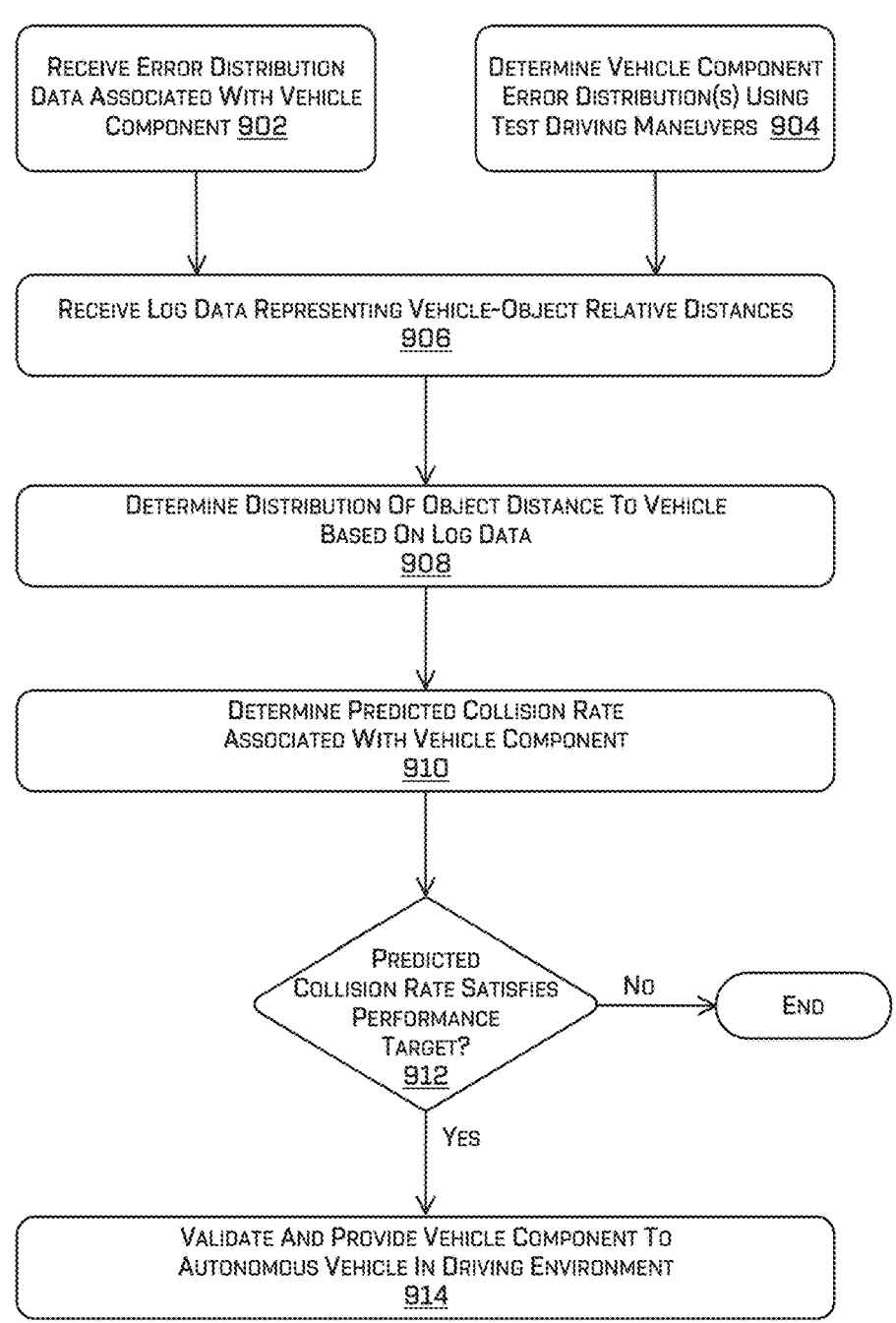

RECEIVE ERROR DISTRIBUTION DATA ASSOCIATED WITH VEHICLE COMPONENT 902

DETERMINE VEHICLE COMPONENT ERROR DISTRIBUTION(S) USING TEST DRIVING MANEUVERS 904

RECEIVE LOG DATA REPRESENTING VEHICLE-OBJECT RELATIVE DISTANCES 906

DETERMINE DISTRIBUTION OF OBJECT DISTANCE TO VEHICLE BASED ON LOG DATA 908

DETERMINE PREDICTED COLLISION RATE ASSOCIATED WITH VEHICLE COMPONENT 910

PREDICTED COLLISION RATE SATISFIES PERFORMANCE TARGET? 912

No

END

Yes

VALIDATE AND PROVIDE VEHICLE COMPONENT TO AUTONOMOUS VEHICLE IN DRIVING ENVIRONMENT 914

FIG. 9

AUTONOMOUS VEHICLE PERFORMANCE MODELING BASED ON CONTROLLER ERROR

BACKGROUND

Vehicles may include controllers and drive systems configured to implement vehicle operations such as propulsion, friction braking, and torque steering, among others. Detecting errors within the vehicle controllers and drive systems may be critical to maintaining vehicle performance and assuring passenger safety. However, vehicle drive systems are often complex interconnected and dynamic systems, including electronic actuators used in combination with other mechanical, electromechanical, hydraulic, and/or electronic components to control the movement and operation of the vehicle, in response to control commands received via vehicle controllers. For instance, a vehicle propulsion system may include an engine, transmission, driveshafts, and differential systems, a steering system may include a steering motor and steering rack, and a braking system may include hydraulic and mechanical braking components. Each of these systems may have additional components and subcomponents which may be subject to failures, wear and tear, and potential errors or degradations. The operation of vehicle drive systems also may depend on additional vehicle systems such as suspensions and tires, and the performance of any or all of these systems may vary based on current driving conditions and vehicle operating states.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 1 illustrates an autonomous vehicle and an example scenario in which a driving trajectory is planned and executed to control the autonomous vehicle within a driving environment.

Figure 2A:
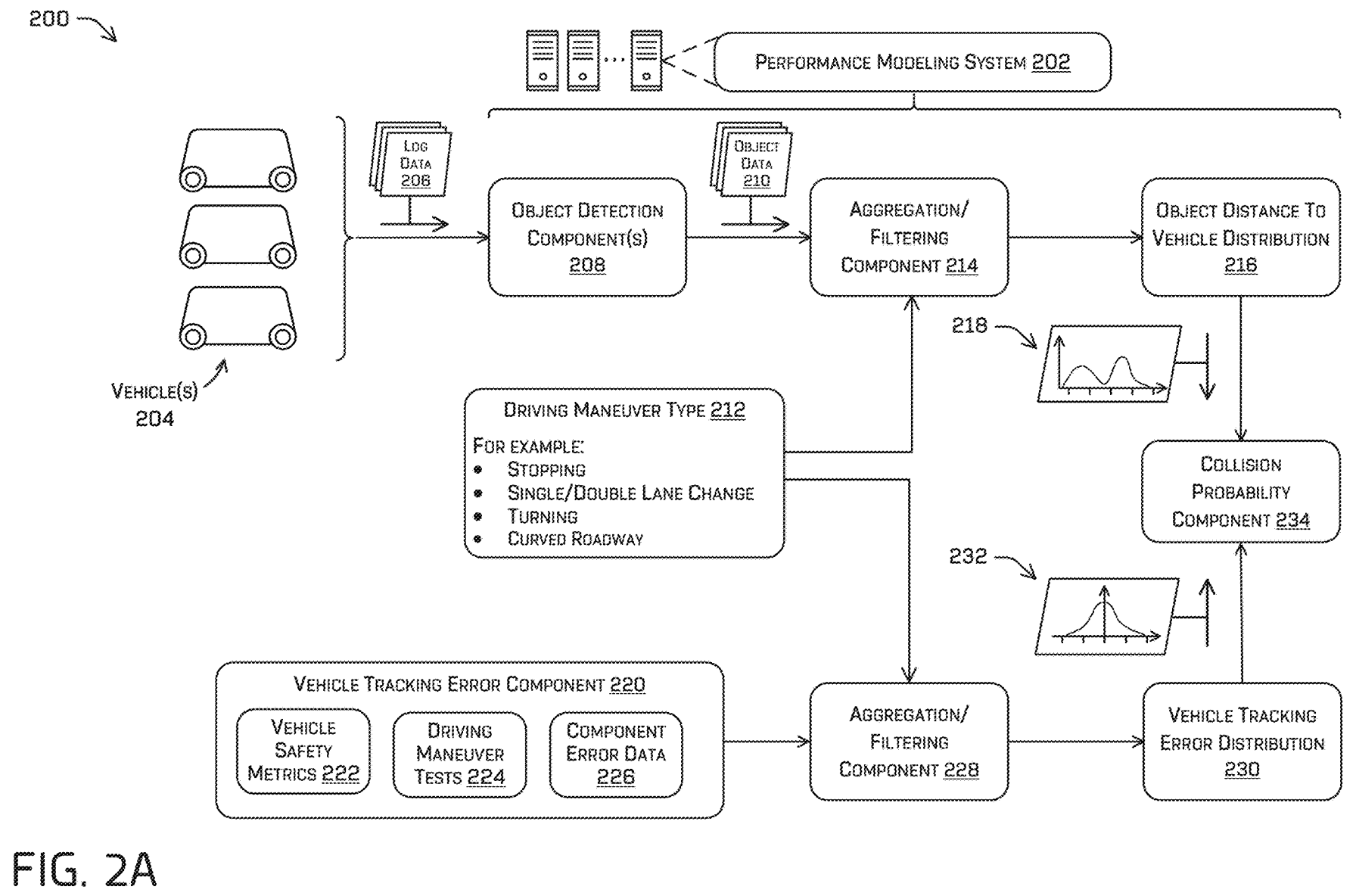

FIG. 2A depicts an example performance modeling system including various components configured to determine object distance to vehicle distributions and vehicle tracking error distributions, in accordance with one or more examples of the disclosure.

FIG. 9 is a flow diagram illustrating an example process for determining predicted collision rates associated with vehicle controllers, based on error distributions associated with the vehicle controllers and distributions of object distance to vehicle based on log data, in accordance with one or more examples of the disclosure.

DETAILED DESCRIPTION

Figure 2B:
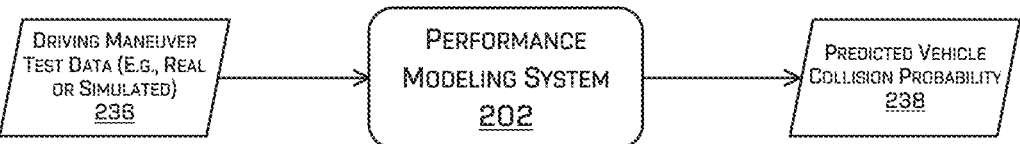
FIG. 2B depicts an example system in which a performance modeling system is used to determine a predicted vehicle collision probability based on driving maneuver test data, in accordance with one or more examples of the disclosure.

This application describes data-driven techniques for determining collision probabilities and/or collision rates associated with vehicle components used in autonomous vehicles. As will be described in detail herein, various complex systems may have inherent errors (e.g., because of physical differences between similar systems, computational errors/accumulations, model errors, etc.). In order to determine whether such a complex system is able to operate safely given both the complexities and errors of the various components and subcomponents (e.g., an autonomous vehicle navigating an environment), the techniques described herein are capable of determining a plurality of error distributions and, based on such distributions, determining whether to validate operation of the complex system for particular tasks. In various examples, a performance modeling system may determine, based on log data captured by vehicles in real-world driving environments, one or more distributions of distances between the vehicles and other objects in the driving environments. Additionally, the performance modeling system may determine one or more tracking error distributions associated with vehicle components (e.g., distributions of how far the vehicle was determined to be relative to where the vehicle was intended to be) used to control an autonomous vehicle to execute a planned trajectory. Based on the vehicle-distance-to-object distribution(s) and the corresponding tracking error distribution(s), the performance modeling system may determine collision probabilities and/or rates associated with the vehicle components.

In various examples, the collision probabilities/rates determined by the performance modeling system may be associated with particular vehicle controller components and/or particular driving maneuvers that may be performed by the vehicle controller components. For example, the performance modeling system may determine collision probabilities associated with various types of lateral tracking errors (e.g., lateral position errors, lateral heading errors, etc.), various types of longitudinal tracking errors (e.g., longitudinal position errors, longitudinal stopping distance errors, longitudinal velocity errors, etc.), and/or combinations of lateral and longitudinal tracking error. Additionally, in some cases, collision probabilities may be determined for particular types of driving maneuvers, particular ranges of lateral and/or longitudinal velocities and accelerations, etc. As described below, the techniques herein may be used to determine target error distributions associated with particular vehicle controller components and/or particular driving maneuvers, based on the safety and performance benchmarks of an autonomous vehicle. Additionally or alternatively, these techniques may be used to predict the overall safety and/or performance metrics of an autonomous vehicle, based on the tracking error distributions that have been received or determined for individual vehicle components on the autonomous vehicle.

Vehicles, autonomous or otherwise, include various complex systems that work interdependently to determine and execute trajectories for the vehicles to use to traverse driving environments. For instance, a vehicle may use various on-board sensors, map data, and localization and perception components to detect and analyze objects in the environment around the vehicle. Based on the analysis of the current driving environment, the vehicle may use a planner component (and/or prediction component) to determine an optimal trajectory for the vehicle to traverse the environment to an intended destination. After determining a trajectory for a vehicle, the trajectory may be provided (e.g., as control signals/instructions) to vehicle controllers and/or drive systems configured to execute vehicle controller operations (e.g., propulsion, braking, steering, etc.) to implement the trajectory. In some examples, vehicle controllers may be implemented as separate lateral and longitudinal controllers, respectively configured to track (laterally and longitudinally) the planned trajectory of the vehicle. Additionally or alternatively, the tracking error of the vehicle may be determined jointly (e.g., including lateral and longitudinal tracking error).

For any number of reasons, the vehicle controllers may be unsuccessful in tracking a planned trajectory with complete accuracy. For example, drive systems of the vehicle often include complex interconnected and dynamic systems, including electronic actuators used in combination with other mechanical, electromechanical, hydraulic, and/or electronic components to control the movement and operation of the vehicle, in response to control commands received via vehicle controllers. For instance, a vehicle propulsion system may include an engine, transmission, driveshafts, and differential systems, a steering system may include a steering motor and steering rack, and a braking system may include hydraulic and mechanical braking components. Each of these systems may have additional components and subcomponents which may be subject to failures, wear and tear, and potential errors or degradations. Additionally, various disturbances or irregularities in the driving environment may affect the vehicle controllers and drive systems, causing the vehicle to deviate from its planned trajectory. Such disturbances or irregularities may include bumps or potholes, loose road surfaces, adverse weather conditions (e.g., rain, wind), and the like. Further, minor errors in vehicle sensor data, localization data, or map data, actuator errors or degradations, and any number of other causes may cause the actual trajectory driven by the vehicle to deviate from its planned trajectory. These deviations, which also may be referred to herein as vehicle tracking errors, can increase the potential collision risk for the vehicle or may and/or various undesirable outcomes that can negatively affect the safety or efficiency of the vehicle while traversing the environment.

To ensure the safe, reliable, and efficient operation of autonomous vehicles in real-world driving environments, autonomous vehicles may be validated relative to a set of vehicle safety benchmarks. For example, safety benchmarks for an autonomous vehicle may define a maximum number of moving impacts or collisions that may occur for the autonomous vehicle over a period of driving time and/or driving miles (e.g., maximum of one collision per 1 million driving miles, one collision per 500,000 driving hours, etc.). However, testing and analyzing vehicle safety benchmarks such as these for autonomous can be technically challenging and computing resource intensive. For example, it may be unacceptable from a safety perspective to drive an autonomous vehicle in a real-world environment to validate a safety benchmark unless it is already known in advance (with sufficient confidence) that the autonomous vehicle will pass the safety benchmark. Additionally, autonomous vehicles are complex systems that use large numbers of interdependent components to detect and analyze the driving environment, determine optimal trajectories for traversing the environment, and execute and evaluate the trajectories. Further, while some components on the autonomous vehicle may operate deterministically, others may operate stochastically (or non-deterministically), such as machine-learned models that incorporate randomness or probabilistic neural networks.

In view of these factors, it may be technically challenging to predetermine whether an autonomous vehicle is likely to satisfy the vehicle safety benchmarks required before the vehicle is permitted to operate in real-world driving conditions. Existing techniques for validating vehicle components outside of a real-world driving environment include individual component testing and simulation testing on the software stack of the autonomous vehicle. However, individual component testing may fail to accurately model the complex interdependencies between the components of the autonomous vehicle systems, while executing and analyzing large amounts of driving simulations (e.g., covering thousands or millions of driving miles) may involve slow and resource-intensive (or resource-prohibitive) computing operations. Similarly, software-based testing and simulation testing may fail to take into account irregularities that may be present in real-world driving environments, as well as potential errors or failures in the non-software components of the autonomous vehicle, including degradations or wear and tear within the mechanical, electromechanical, hydraulic, and/or electronic components on the vehicle. Thus, component testing and simulation testing may be unable to accurately diagnose failures of the vehicle safety benchmarks, and to attribute faults to specific components (or combinations of components) within the complex, interdependent, and stochastic systems of the autonomous vehicle. Similar technical difficulties may arise when attempting to predict the effect of changes to individual components of the autonomous vehicle on the safety benchmarks of the vehicle as a whole.

To address the challenges associated with verifying and validating the performance and safety of vehicle controllers and other autonomous vehicle components, various techniques described herein relate using data-driven distributions of vehicle-distance-to-object, in combination with tracking error distributions associated with vehicle controllers, to determine collision probabilities and/or rates associated with the vehicle controllers. For example, a performance modeling system may use log data from vehicles within real-world driving environments to determine object distance distributions (e.g., vehicle-distance-to-object) and/ or other data-driven distributions based on location and state data of objects/agents in the environment relative to the vehicle. The performance modeling system may use these data-driven distributions in combination with tracking error distributions of vehicle controllers, to determine collision probabilities and/or collision rates associated with the vehicle controllers.

Although the examples herein may be used to determine collision probabilities and/or collision rates, in other examples, similar or identical techniques may be used to determine probabilities and/or rates of various non-collision events. For example, similar data-driven distance distributions from the log data and tracking error distributions associated with vehicle controllers can be used to determine probabilities and/or rates of events such as near-miss collisions, disengagements of an autonomous driving feature, activation of a vehicle safety systems (e.g., a collision avoidance system), and the like. Additionally, these techniques can be used to determine probabilities and/or rates of particular types or subsets of collisions, based on impact angle, impact velocity, driving maneuver, collision severity, etc.

In some examples, the techniques herein may be used to determine target error distributions for particular vehicle controllers and/or particular vehicle controller operations, based on an overall safety benchmark for the autonomous vehicle as a whole. For instance, based on an overall target collision benchmark for the vehicle, the performance modeling system may determine a corresponding error distribution for the vehicle controller that will cause the vehicle to achieve the target collision benchmark. When the vehicle includes multiple vehicle controllers (e.g., separate lateral and longitudinal controllers) and/or controllers configured to perform different vehicle control operations (e.g., acceleration, braking, steering maneuvers, etc.), the performance modeling system can determine different combinations of error distributions for the vehicle controllers and/or control operations that will cause the vehicle as a whole to achieve the overall target collision benchmark. Additionally, when a first tracking error distribution changes (e.g., a lateral tracking error distribution), the change may cause a corresponding change in a second tracking error distribution (e.g., a longitudinal tracking error distribution) to ensure that the combination of error distributions will cause the vehicle to achieve the overall target collision benchmark.

Additionally or alternatively, the techniques herein may be used to determine the predicted overall collision metrics for an autonomous vehicle, based on one or more tracking error distributions associated with the vehicle controllers and/or control operations. For instance, the performance modeling system may receive a tracking error distribution for a vehicle controller (or multiple tracking error distributions associated with different vehicle controllers or vehicle control operations) and use those distributions along with the data-driven distance distributions based on log data, to determine an overall predicted collision probabilities or rates.

Thus, in various examples, the performance modeling system may determine collision probabilities or rates associated with individual vehicle controllers, individual vehicle control operations, and/or for the autonomous vehicle as a whole. For example, different tracking error distributions can be determined for a lateral or longitudinal vehicle controller, and/or particular driving maneuvers performed by the vehicle controllers. Such driving maneuvers can include, for instance, stopping maneuvers, turning maneuvers, single-lane change or double-lane change maneuvers, straight-line or curved driving maneuvers, etc. Driving maneuvers also may be defined in terms of ranges/partitions velocity, lateral acceleration, and/or longitudinal acceleration. In these examples, different collision probabilities or rates (or changes to existing collision probabilities or rates) can be determined for any driving maneuver or combination of driving maneuvers, based on the tracking error distributions associated with those driving maneuvers.

In some examples, vehicle tracking error distributions can be determined for different vehicle components and/or different vehicle control operations. For instance, within the complex and interdependent systems of an autonomous vehicle, tracking errors may be caused by errors within individual components and/or combinations of interacting components. Examples of component errors may include vehicle controller errors (e.g., lateral tracking errors, longitudinal tracking errors, etc.), actuator errors, drive system components errors, localization errors, map data errors, etc. In various examples herein, tracking error distributions and/or associated collision probabilities can be associated with and attributed to various individual components on the vehicle, and/or combinations of interacting components.

Errors or failures within certain autonomous vehicle components, such as sensors and perception components, might not contribute to vehicle tracking errors but instead may contribute to errors in the object distance measurements captured within vehicle log data. Therefore, in some examples, sensor and/or perception error rates may be applied to the object distance distributions determined based on the log data. In these examples, similar techniques can be used to determine collision probabilities and/or rates associated with errors in sensor data and/or errors in the perception component of the autonomous vehicle, as well as determining the effect of changes in sensor or perception error distributions on the predicted collision probability of the vehicle as a whole.

Thus, the techniques described herein may provide a number of technical advantages over existing systems for validating performance and safety benchmarks of autonomous vehicle components. Initially, these techniques may allow the performance modeling system to validate performance and/or safety benchmarks for an autonomous vehicle, without requiring the vehicle to operate in real-world driving environments to validate the benchmarks. Instead, the performance modeling system may validate with sufficient confidence the overall performance and safety benchmarks for the vehicle as a whole, based on the tracking error distributions of the various components/sub-components of the vehicle. These techniques also account for the complexity, interdependency, and stochastic operation of the various vehicle components, to ensure that the vehicle achieves its overall target for collisions and other events, without needing to operate the vehicle in real-world environments for thousands or millions of miles to perform the verification. Additionally, these techniques can be used to determine the maximum acceptable amounts of tracking error for individual systems or components on the vehicle, while still ensuring the overall vehicle performance and safety benchmarks are met. Further, these techniques provide for improved diagnoses of failures of the vehicle safety benchmarks, so that safety benchmark changes or failures can be accurately attributed to specific components (or combinations of components) operating on the vehicle.

The techniques described herein may be implemented in a number of ways. Example implementations are provided below with reference to the following figures. Although discussed in the context of prediction models for use on autonomous vehicles, the methods, apparatuses, and systems described herein may be applied to a variety of systems (e.g., a sensor system or a robotic platform), and are not limited to autonomous vehicles. In one example, similar techniques may be utilized in driver-controlled vehicles in which such a system may provide an indication of whether it is safe to perform various maneuvers. In various other examples, the techniques may be utilized in an aviation or nautical context, and may be incorporated into any ground-borne, airborne, or waterborne vehicle using route planning techniques, including those ranging from vehicles that need to be manually controlled by a driver at all times, to those that are partially or fully autonomously controlled.

Figure 1:
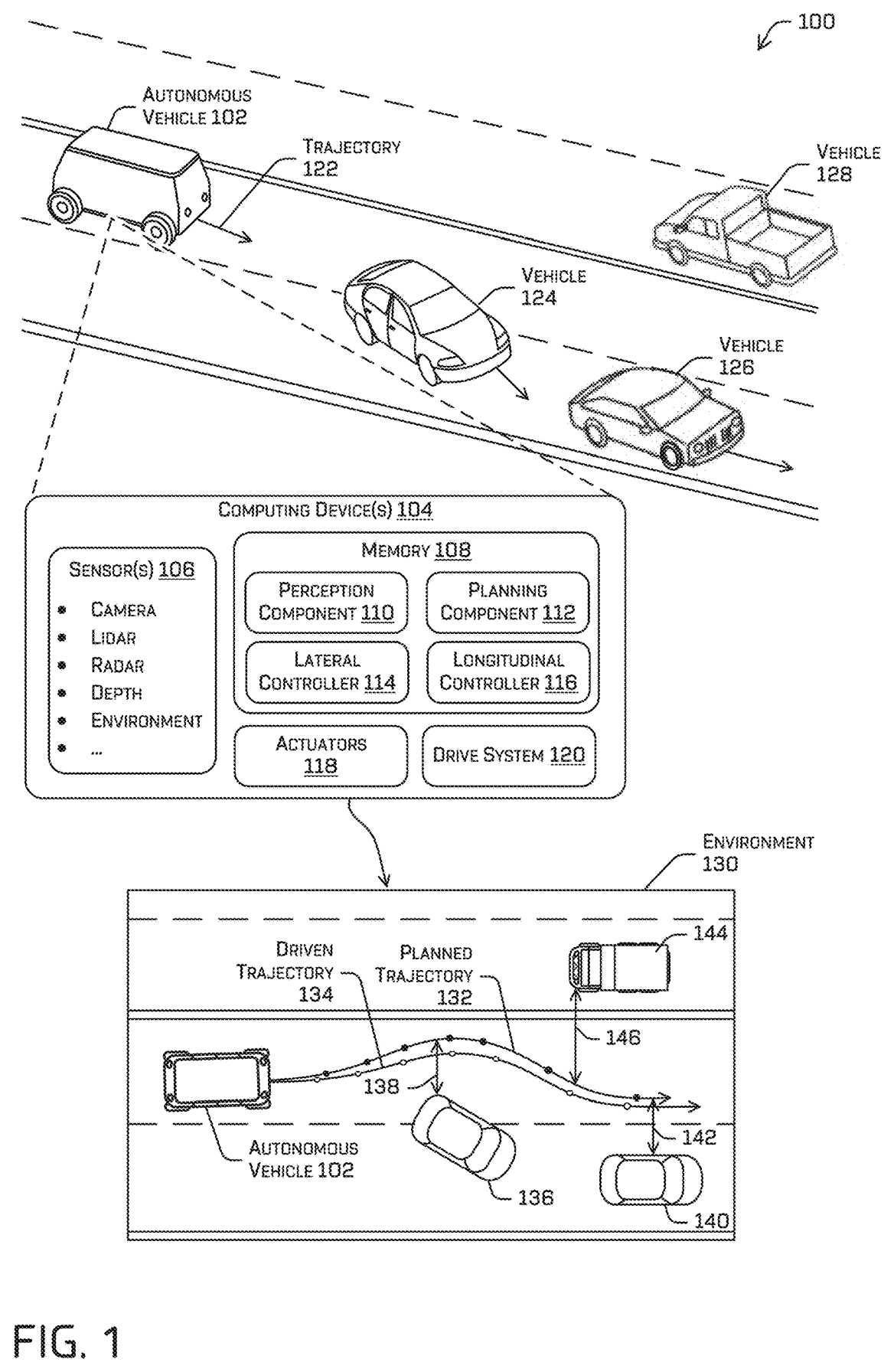

FIG. 1 illustrates an example scenario 100 including an autonomous vehicle 102 configured to determine and follow trajectories through a driving environment. In some instances, the autonomous vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 102 may be a fully or partially autonomous vehicle having any other level or classification. It is contemplated that the techniques discussed herein may apply to more than robotic control, such as for autonomous vehicles. For example, the techniques discussed herein may be applied to determining and following trajectories in the context of video games, manufacturing, robotics, augmented reality, etc.

According to the techniques discussed herein, the vehicle 102 may receive sensor data from sensor(s) 106 of the vehicle 102. For example, the sensor(s) 106 may include location sensors (e.g., a global positioning system (GPS) sensor), inertia sensors (e.g., an accelerometer sensor, a gyroscope sensor, etc.), magnetic field sensors (e.g., a compass), position/velocity/acceleration sensors (e.g., a speedometer, a drive system sensor), lidar sensors, radar sensors, depth sensors (e.g., sonar sensors, time of flight (ToF) sensors, depth cameras, and/or other depth-sensing sensors), image sensors (e.g., cameras), audio sensors (e.g., microphones), and/or environmental sensors (e.g., a barometer, a hygrometer, etc.). In some examples, a simulated sensor may correspond to at least one of the sensor(s) 106 on the vehicle 102, and in a simulation, one or more of sensor(s) 106 may be simulated. In some examples, the position of a simulated sensor may correspond with a relative position of one of the sensor(s) 106 to the vehicle 102.

The sensor(s) 106 may generate sensor data, which may be received by computing device(s) 104 associated with the vehicle 102. However, in other examples, some or all of the sensor(s) 106 and/or computing device(s) 104 may be separate from and/or disposed remotely from the vehicle 102 and data capture, processing, commands, and/or controls may be communicated to/from the vehicle 102 by one or more remote computing devices via wired and/or wireless networks.

The autonomous vehicle 102 may comprise computing device(s) 104 that may include various ML models and/or navigation systems as discussed herein. For example, the computing device(s) 104 comprise a memory 108 storing a perception component 110 and a planning component 112 (which also may include a prediction component). The planning component 112 may include various components configured to execute tree search techniques, including using a trained action selection ML model to determine subsets of candidate actions to explore during the tree search. The sensors 106, perception component 110 and/or planning component 112 may comprise the hardware and/or software for conducting the operations discussed herein related to trajectory determination and navigation of the autonomous vehicle 102. The various navigational systems described herein may comprise more or less components, but the perception component 110 and/or planning component 112 are given as a non-limiting example for the sake of comprehension.

After determining one or more trajectories for the autonomous vehicle 102 to follow at particular times/locations in the driving environment, the planning component 112 may provide the trajectories to one or more vehicle controllers to implement the trajectories. As shown in this example, the computing device(s) 104 may include a lateral controller 114 configured to implement the lateral components of a determined trajectory (e.g., heading, steering angle, etc.), and a longitudinal controller 116 configured to implement the longitudinal components of the determined trajectory (e.g., speed, longitudinal acceleration, braking, etc.). The lateral controller 114 and longitudinal controller 116 may output control signals to actuators 118, which may control the various drive systems 120 of the vehicle.

In some examples, the various vehicle navigation systems and functionalities within the memory 108 described herein may comprise processor-executable instructions stored in a memory of the computing device(s) 104 and/or accessible thereto, hardware, and/or some combination thereof (e.g., a field-programmable gate array (FPGA), application-specific integrated circuit (ASIC)).

In this example, the autonomous vehicle 102 is depicted driving in an environment following an initial trajectory 122. To a subsequent trajectory for the vehicle to follow (e.g., at one or more future time steps), the autonomous vehicle 102 may analyze its current vehicle state, the current (and predicted future) state of the driving environment, and the intended destination (or end state) representing a location, state, pose, etc., that the autonomous vehicle 102 intends to achieve. As used herein, a "state" or "vehicle state" may include geometric state data, such as position (or location) and/or a pose (e.g., position and/or orientation/heading including yaw and steering angle) of a vehicle. Additionally, in some examples, a vehicle state may comprise any combination of a geometric state data for a vehicle, as well as temporal state data for the vehicle (e.g., a velocity, acceleration, yaw, yaw rate, steering angle, steering angle rate, etc.) and/or may include any other status data associated with the vehicle (e.g., current vehicle status data, the status of vehicle signals and operational controls, etc.).

As the autonomous vehicle 102 operates within the environment, it may receive map data of the environment (e.g., from a local or remote map system), and perception data (e.g., sensor data) from the perception component 110. The map data may include, for example, road data determined based on a map of the driving environment and/or localizing the autonomous vehicle 102 within the environment. For instance, the map data may include data associated with any number of road segments (e.g., lane segments) in the driving environment, such as the location (e.g., boundaries), size (e.g., length and width), and shape (e.g., curvature) of the road segment, as well as additional attributes of the road segment such as directionality, speed limit, gradient, road surface, etc.

The autonomous vehicle 102 also may receive sensor data from sensor(s) 106 of the autonomous vehicle 102. The perception component 110 may include one or more ML models and/or other computer-executable instructions for detecting, identifying, segmenting, classifying, and/or tracking objects from sensor data collected from the environment of the autonomous vehicle 102. For example, data generated by the perception component 110 may be used by the autonomous vehicle 102 to localize its position within the driving environment relative to the map data. In some instances, the perception component 110 also may generate drivable surface maps and/or occupancy maps indicating which areas of the environment are drivable and non-drivable surfaces, as well as which locations within the environment are occupied by objects or are free space locations that are unoccupied and in which autonomous vehicle may operate.

As the autonomous vehicle operates in the environment, it may encounter a scenario like example scenario 100 in which other vehicles, static objects, and/or other obstructions may block some or all of the lanes of the roadway, and may cause the planning component 112 to determine trajectories and/or driving maneuvers such as changing positions within the current driving lane, perform lane changes, decelerating/accelerating, stopping the vehicle, and the like, so that the autonomous vehicle 102 may proceed safely through the driving environment. As shown in this example, the scenario 100 includes three additional vehicles 124-128 which may present a potential impediment and/or safety hazard to the autonomous vehicle 102 as it proceeds along the route to its intended destination.

The planning component 112 may use the map data and perception data and may apply various trajectory optimization techniques to determine a planned trajectory 132 for the autonomous vehicle 102 to follow to traverse the driving environment 130. The trajectory 132 may continuously and feasibly connect the current vehicle state with its intended end state. In some examples, the planning component 112 may determine the trajectory 132 as an improved or lowest cost (e.g., optimal) trajectory by executing a tree search in conjunction with an action selection ML model used to determine subsets of candidate actions to explore within the tree structure. In some cases, the trajectory 132 may represent an optimal and/or lowest-cost trajectory determined by the planning component 112 after evaluating a number of kino-dynamically feasible trajectories determined by a tree search technique, based on safety costs (e.g., potential interactions with objects/agents), passenger comfort costs, route progress costs, etc. As the autonomous vehicle 102 traverses the environment 130, it may periodically (e.g., every second, ten times per second, etc.) use the planning component 112 to recompute and implement an updated planned trajectory.

In this example, the planning component 112 has determined the planned trajectory 132 to control the autonomous vehicle 102 to traverse the environment 130. In other examples, the planning component 112 may determine any number of alternative low-cost trajectories using search trees and/or the various other techniques described herein. To implement planned trajectory 132, the planning component 112 may generate, substantially simultaneously, a plurality of potential vehicle control actions for controlling the motion of the autonomous vehicle 102 in accordance with a receding horizon technique (e.g., 1 micro-second, half a second, multiple seconds, etc.) based at least in part on the trajectory 132. The planning component 112 may provide the trajectory 132 and/or the vehicle control actions to the lateral controller 114 and longitudinal controller 116, which may implement the planned trajectory 132 via the actuators 118 and drive systems 120 as described herein.

However, for any number of reasons, the autonomous vehicle 102 may fail to track the planned trajectory 132 with complete accuracy. For instance, due to errors or degradations (e.g., wear and tear) in the lateral controller 114, the longitudinal controller 116, the actuators 118, and/or the drive systems 120, the autonomous vehicle 102 in this example may follow a driven trajectory 134 that diverges from the planned trajectory 132. Additionally or alternatively, deviations between the planned trajectory 132 and the driven trajectory 134 may be caused by one or more errors or degradations in the sensors 106, irregularities of the road surface or driving environment, localization or map data errors, etc. As noted above, the waypoint-by-waypoint deviations between the planned trajectory 132 and the driven trajectory 134 may be referred to as vehicle tracking errors.

As shown in this example, when the driven trajectory 134 diverges from the planned trajectory 132, the divergence may bring the autonomous vehicle 102 closer to some objects in the environment (e.g., other agents, static objects, road features, etc.), which may potentially increase the risk of a collision. For instance, the driven trajectory 134 causes the autonomous vehicle 102 to pass closer than intended to the agent 136 (e.g., closer than the planned lateral distance 138 between the agent 136 and the planned trajectory 132), and closer than intended the agent 140 (e.g., closer than the planned lateral distance 142), but farther than intended from agent 144 (e.g., farther than the planned lateral distance 146).

FIG. 2A is an example block diagram illustrating an example architecture 200 of a performance modeling system 202. In this example, the performance modeling system 202 may be configured to determine object distance distributions based on log data (e.g., object distance to vehicle distribution 218) and to determine tracking error distributions associated with vehicle controllers and/or driving maneuvers (e.g., vehicle tracking error distribution 230). Based on these distributions, the performance modeling system 202 may determine collision probabilities associated with the vehicle controllers.

In the current example, log data 206 may be received from one or more vehicles 204 operating on various roadways in real-world driving conditions and environments. The log data 206 may include vehicle state data, sensor data, perception data, prediction data, trajectory information, map data, driving condition data, derived data passed between components and subcomponents (e.g., detections based on sensor data, commands, component status, etc.), and the like. For example, a particular log data record in the log data 206 may include data indicating the driving operations and maneuvers/trajectories performed by a real-world vehicle (or a simulated vehicle) over a period of time. The log data record also may include sensor data and perception data representing various objects (e.g., other agents, static objects, and/or map data features) detected in the driving environment during the period of time while the vehicle is performing the driving maneuvers. For instance, the log data captured by a vehicle representing additional agents/objects in the driving environment may include, for each agent or object, the relative distance and other relative state data (e.g., relative heading, relative pose, relative velocity, etc.) at various time points during the log data record.

The log data 206 may be processed by an object detection component 208. In some examples, the object detection component 208 may determine the existence of objects within each of a number of discrete log data files, frames, and/or regions within the log data 206. For example, one or more objects may be present in a particular region of the log data 206. The object detection component 208 may then determine or identify a classification or type associated with each object in each region of the log data and may extract (or determine) parameters associated with each object. For example, for an agent detected within the log data 206 (e.g., another vehicle, a bicycle, a pedestrian, etc.), the object detection component 208 may determine parameters such as the position, heading, total velocity, total acceleration, longitudinal acceleration, lateral acceleration, distance to the vehicle 204 (e.g., the ego vehicle, or vehicle that captured the log data), yaw, yaw rate, lane identifier, road identifier, and the like, for the agent at any number of periodic time points while the agent is detected within the environment. The object detection component 208 also may perform log data filtering in some examples, in which log data 206 corresponding to different time intervals is filtered to one or more trained models to determine arrangements of objects, parameters, and object states relative to the vehicle 204 that captured the log data 206. In some cases, log data filtering may be performed to remove or prevent non-relevant or impossible/improbable data (such as log data representing physically impossible parameters) from being incorporated into the downstream scenario representations and models.

In some examples, the object detection component 208 may generate a scenario representation (e.g., a top-down multichannel representation, a vector representation, etc.) associated with the log data 206, which may include vectorized data defining representative object data 210 in the scenario. The object data 210 may comprise parameters associated with the vehicle 204 itself, as well as features of any agents/object within the scenario and/or the physical environment from which the log data 206 was generated. Object data 210 within top-down representations may be incorporated into top-down scenario representations including image(s) (and/or other types of encodings or representations) that represent the environment of the log data 206 at a particular time and may include one or more bounding boxes representing the locations and extent (e.g., length and width) of the objects in the object data 210 at the indicated times. Further, top-down scenario representations can include bounding boxes representing the ego vehicle (e.g., vehicle 204) and/or other agents, objects, and map data features in the environment. As can be understood, a top-down scenario representation may include any number of static objects (e.g., buildings, trees, curbs, sidewalks, map elements, etc.) or dynamic objects (e.g., agents) in the environment at any time, and is not limited to one agent/bounding box.

As shown in this example, the scenario representations and/or object data 210 identified by the object detection component 208 may be provided to an aggregation/filtering component 214. In some examples, the aggregation/filtering component 214 may be configured to aggregate, analyze, and filter large amounts of object data 210 captured by multiple vehicles 204 and/or represented within multiple records of log data 206. Based on inputs corresponding to a driving maneuver type 212 (and/or other filtering data), the aggregation/filtering component 214 may be configured to determine a subset of the object data 210 associated with a particular driving maneuver type 212 that was performed by the vehicles 204 and/or particular driving conditions within which the vehicles 204 were operating when the log data 206 was captured. For instance, object data 210 may include agent state data (e.g., agent positions, velocities, headings, distances to the vehicle 204, etc.) for any number of detected agents, at any times within the log data 206. The aggregation/filtering component 214 may aggregate the object data 210 over the multiple vehicles 204 and time periods, and then filter the object data 210 to include only a particular subset of the object data 210 relating to particular objects perceived by the vehicle 204 (e.g., agents) at times when the vehicles 204 were performing the particular driving maneuver type 212. As one example, a set of object data determined by the aggregation/filtering component 214 may include an aggregation of the distances of the vehicles 204 to the closest agents positioned in front of the vehicles 204, at times when the vehicles 204 were performing stopping maneuvers. As another example, another set of object data determined by the aggregation/filtering component 214 may include an aggregation of the lateral distances of the vehicles 204 to the closest agents or other objects (e.g., parked cars, curbs or other road features, etc.) at times when the vehicles 204 were performing other particular driving maneuvers (e.g., left/right turns, lane changes, straight or curved lane driving, etc.). Although only these two examples are described here, any number of other examples are contemplated in which the aggregation/filtering component 214 determines particular relative data (e.g., relative distances, velocities, headings, etc.) between the vehicles 204 and particular objects (e.g., all agents, agents of specific types/classifications, static objects, road features, etc.), that are associated with particular driving maneuver types of the vehicles 204 (e.g., turns, stopping, etc., as well as various velocity and lateral/longitudinal acceleration ranges, etc.), and/or that are associated with particular driving conditions (e.g., road conditions, weather conditions, visibility conditions, traffic conditions, geographic regions, etc.).

Based on the subset(s) object data determined by the aggregation/filtering component 214, a first distribution component 216 may determine a first distribution 218 representing the data-driven distribution of objects detected within the log data 206 relative to the vehicles 204 that captured the log data 206. As shown in this example, the first distribution 218 represents a distribution of perceived distances from a vehicle 204 to a detected object at times when the vehicle 204 is performing a particular driving maneuver type 212. The distances within the first distribution 218 may be associated with a particular driving maneuver type 212 (e.g., a stopping maneuver, a turning maneuver, normal straight line or curved road driving, etc.), and accordingly may be associated with a particular distance direction (e.g., front longitudinal distance for stopping maneuvers, right-side lateral distance for right-turn maneuvers, etc.), though any other parameter may be used for such determinations.

In various examples, the first distribution component 216 may generate the distributions representing object distances to the vehicle 204, based on the log data 206, using any number of different techniques. In some cases, the first distribution component 216 may determine each distance between an object and the vehicle (e.g., the ego vehicle 204 that captured the log data 206) as the distance between the perceived location of the object and the closest point on the planned trajectory of the vehicle 204. Referring again to FIG. 1, for the log data 206 representing the driving environment 130 at the time shown in the figure (e.g., when the driven trajectory 134 has not yet been performed), the first distribution component 216 may determine the distance between the autonomous vehicle 102 and the agent 136 as distance 138 (e.g., the lateral distance between the agent 136 and the planned trajectory 132 of the autonomous vehicle 102). Similarly, the first distribution component 216 may determine the distance between the autonomous vehicle 102 and the agent 140 as distance 142 (e.g., the lateral distance between the agent 140 and the planned trajectory 132) and may determine the distance between the autonomous vehicle 102 and the agent 144 as distance 146 (e.g., the lateral distance between the agent 144 and the planned trajectory 132). In these examples, the object distance to vehicle distribution 218 may include a distribution of distances between objects detected in the log data 206 and the closest point on the planned trajectory of the vehicle 204 that captured the log data. In other examples, the object distance to vehicle distribution 218 may include a distribution of distances between the objects detected in the log data 206 and the vehicle 204 itself (e.g., not the planned trajectory of the vehicle 204).

As illustrated in this example, the first distribution component 216 also may determine separate lateral and longitudinal distance distributions as the vehicle distance to object distribution 218. In such cases, the first distribution component 216 may determine separate lateral object-to-vehicle distances and longitudinal object-to-vehicle distances, and then may generate separate lateral and longitudinal distance distributions. In these examples, both the lateral and longitudinal distances can be determined by comparing the perceived position of an object within the log data 206 to the closest vehicle position on the planned trajectory of the ego vehicle 204. In other examples, rather than determining separate lateral and longitudinal distances, and separate lateral and longitudinal object distance to vehicle distributions, the first distribution component 216 may determine the distance as single straight-line distance from the object the closest point of the planned trajectory of the ego vehicle 204.

The above examples describe generating the data-driven object distance to vehicle distributions (e.g., first distribution 218) based on the distances between the perceived objects in the log data 206 and the planned trajectory of the ego vehicle 204 that captured the log data 206. In other examples, object distance to vehicle distributions may be based on the distances (e.g., lateral, longitudinal, and/or joint distances) between the position of perceived objects and the position of the vehicle 204 itself at the time the log data 206 was captured (e.g., rather than the closest point on the planned trajectory of the vehicle 204). In some cases, the first distribution component 216 also may into account the respective positions (e.g., current and/or planned) of the vehicle 204 and objects in the log data 206, as well as the sizes, orientations, and/or other features of the vehicle 204 and the perceived objects. For instance, the first distribution component 216 may generate or receive bounding boxes for the perceived objects in the log data 206 and bounding boxes (e.g., for the current state and/or states along the planned trajectory) for the vehicle 204 at different points within the log data 206, and may compute the distances using the nearest points on each of the respective bounding boxes.

To generate an object distance to vehicle distribution 218, the first distribution component 216 may determine any number of vehicle-to-object distance measurements based on the log data 206, including distance measurements to different objects, distance measurements and different points in time within the log data 206 for a vehicle, and distance measurements within log data 206 captured by different vehicles 204. The object distance to vehicle distribution(s) 218 may be generated based on these various distance measurements. To generate an object distance to vehicle distribution 218, the first distribution component 216 may use log data 206 captured by multiple vehicles 204, each driving over a period of time in a different (or the same) driving environment. Within the log data 206 captured by a vehicle 204, the first distribution component 216 may periodically (e.g., N times per second, every output cycle of the planner component, etc.) evaluate the log data to determine the distances of one object (or multiple objects) to the vehicle 204 at each periodic time. In some cases, each object distance for each object perceived at each time in the log data 206 may be used as a point in the object distance to vehicle distribution 218. In other cases, the first distribution component 216 may average all the object distances for the objects perceived at a particular point in time, and each point in the distribution 218 may represent the average object distance perceived by a vehicle 204 at a particular time in the log data 206.

When generating the object distance to vehicle distribution 218, the first distribution component 216 also may apply various rules and/or filters to the techniques described herein, thereby limiting which object detections in the log data 206 are used to generate the distribution. For example, as described above, the aggregation/filtering component 214 may be used to generate object distance to vehicles distributions that may be associated with particular object types (e.g., pedestrians only, other vehicles only, etc.) and/or particular types of driving maneuvers. Additionally, the first distribution component 216 may be configured to generate different object distance to vehicles distributions for different geographical regions (e.g., different types of roads/highways, urban versus rural versus suburban driving, and/or for different geofence areas, etc.). Additionally, in some examples, to increase the accuracy of the object distance measurements in the log data 206 (e.g., for lateral object distance to the vehicle 204, or to the planned trajectory of the vehicle 204), the first distribution component 216 may use a longitudinal distance filter, so that only those objects within the log data 206 that are within a threshold longitudinal distance to the vehicle 204 will be used for the generating the object distance to vehicle distribution. The longitudinal distance filter may take the form of a sliding longitudinal window, so that as the log data 206 for a particular vehicle 204 is analyzed periodically, the first distribution component 216 may include the object detections within the sliding longitudinal window at each time/distance point in the periodic analysis. The first distribution component 216 may apply other rules in certain examples, to include and/or exclude particular objects when generating the object distance to vehicle distribution 218. For example, the first distribution component 216 may apply a rule that includes or excludes objects based on their lane relative to the current driving lane of the vehicle 204. For instance, for lateral distance distributions, the first distribution component 216 may exclude objects in the current lane of the vehicle 204 (e.g., where lateral distance to the planned trajectory of the vehicle 204 might not be realistic), but may include objects in the adjacent lanes and/or oncoming traffic lanes.

The performance modeling system 202 may include a vehicle tracking error component 220 configured to receive and/or determine tracking error data associated with the vehicle controllers (and/or other components or systems) of an autonomous vehicle. As shown in this example, the vehicle tracking error component 220 may use one or more components, individually or in combination, to determine the vehicle controller tracking error data. In some examples, to determine tracking error data the vehicle tracking error component 220 can use vehicle safety metrics data 222, which may correspond to a set of overall safety and performance benchmarks for an autonomous vehicle. Additionally or alternatively, the vehicle tracking error component 220 can use driving maneuver test data 224 and/or component error data 226 to determine the tracking error data to be used by the performance modeling system 202.

As described below in more detail, the performance modeling system 202 may use the tracking error data to determine corresponding collision probabilities (and/or collision rates) associated with the vehicle controllers and/or other components of an autonomous vehicle. The performance modeling system 202 can be applied in various use cases, based on provided tracking error data, measured empirical tracking error data, and/or hypothetical tracking error data, to provide different types of collision probability data.

In some examples, the vehicle tracking error component 220 may use driving maneuver test data 224, representing the results of empirical tests (e.g., closed-course driving tests) of an autonomous vehicle. For instance, an autonomous vehicle 102 that uses vehicle controllers (e.g., lateral controller 114 and longitudinal controller 116) and related components to track planned trajectories, may be controlled to perform various different types of driving maneuvers (e.g., lane changes, turns, braking, and acceleration maneuvers, etc.). Each driving maneuver may be performed one or more times at various speeds, various driving conditions, etc., and the tracking errors associated with the driving maneuvers may be measured, either using on-vehicle tracking error measurement of external sensors (e.g., closed driving course cameras and sensors, etc.).

Additionally or alternatively, the vehicle tracking error component 220 may use component error data 226, which may include predetermined tracking error data associated with various vehicle controllers and components. For instance, the lateral controller 114, the longitudinal controller 116, the actuators 118, the drive system 120, and/or various other vehicle components (e.g., sensors 106, perception component 110, etc.) may undergo component testing and/or simulation testing, individually or in combination. The results of the component/simulation testing may be provided to the vehicle tracking error component 220 as component error data 226.

In the examples including driving maneuver test data 224 and component error data 226, the tracking error data used by the vehicle tracking error component 220 may represent actual observed tracking error data associated with the vehicle controllers (and/or actuators, driving system components, etc.). Accordingly, the resulting vehicle tracking error distributions 230 in these examples also may be based on actual measured tracking error, and thus the collision probabilities determined by the collision probability component 234 may represent the predicted collision probabilities for the autonomous vehicle 102 that correspond to the observed tracking errors associated with the vehicle controllers.

In other examples, the vehicle tracking error component 220 may receive vehicle safety metrics data 222 corresponding to an overall performance or safety benchmark for the autonomous vehicle as a whole. For example, vehicle safety metrics data 222 may represent a maximum number of collisions permitted for the autonomous vehicle 102 over a period of driving time and/or driving miles, for the vehicle to satisfy a collision safety benchmark. Unlike the previous examples, the tracking error data used by the vehicle tracking error component 220 in these examples does not represent actual observed tracking error data associated with the vehicle controllers. Instead, in these examples, the vehicle tracking error component 220 may determine assumed or hypothetical tracking error data (e.g., using estimation or a guess-and-check problem solving strategy) based on the vehicle safety metrics data 222. For instance, the vehicle tracking error component 220 may generate hypothetical tracking error data associated with the lateral controller 114, the longitudinal controller 116, and/or other components (which also may be partitioned in tracking error data partitions associated with different driving maneuvers, driving conditions, regions, etc.). The hypothetical tracking error data in these examples may be used to generate vehicle tracking error distributions 230, and the collision probabilities determined by the collision probability component 234 may be compared to the vehicle safety metrics data 222 to determine if the hypothetical tracking error data for the vehicle controllers will cause the autonomous vehicle 102 as a whole to achieve the overall vehicle safety metrics data 222.

Additionally, as shown in this example, the tracking error data used by the vehicle tracking error component 220 also may be aggregated and/or filtered by the aggregation and filtering component 228. The aggregation and filtering component 228 may be configured to aggregate, analyze, and/or filter vehicle tracking error data using similar or identical filtering criteria to those used by the aggregation/filtering component 214. For instance, when driving maneuver-specific tracking error data is available and provided by the vehicle tracking error component 220, the aggregation and filtering component 228 is capable of filtering the tracking error data to one or more particular driving maneuver types 212. Similarly, when driving condition-specific tracking error data is available and provided by the vehicle tracking error component 220, the aggregation and filtering component 228 may filter the tracking error data based on or more particular driving conditions (e.g., specific road conditions, weather conditions, visibility conditions, geographic regions, etc.).

As described below in more detail, the collision probability component 234 may be used to determine predicted collision probabilities based on the first distribution (e.g., the object distance to vehicle distribution 218) and the second distribution (e.g., the vehicle tracking error distribution 230). In some examples, the predicted collision probabilities may be applicable to the operation of an autonomous vehicle 102 as a whole, with respect to all driving maneuvers, all driving environments, all driving conditions, etc. In other examples, corresponding aggregation and/or filtering may be applied to the log data 206 and to the vehicle tracking error data (e.g., filtering based on specific driving maneuvers, agent/object types, driving conditions, driving regions, etc.), so that the object distance to vehicle distribution 218 and the vehicle tracking error distribution 230 relate to the same subset of driving maneuvers, driving conditions, etc. In these examples, the collision probability component 234 may determine predicted collision probabilities associated with particular selected sets of driving maneuvers, driving conditions, etc.

As described above, the performance modeling system 202 may be used in various downstream use cases, including use cases of predicting an overall vehicle collision probability (or other event probability) based on test data from specific driving maneuvers, and use cases of determining target error distributions for various driving maneuvers that correspond to an overall target vehicle collision probability.

Referring to FIG. 2B, an example system is shown in which the performance modeling system 202 may be used to determine a predicted vehicle collision probability based on empirical driving maneuver test data. In this example, driving maneuver test data 236 may include driving maneuver test data 224, such as real-world or simulated closed-course driving test results, performed for an autonomous vehicle 102 using a specific set of vehicle control components. For example, a real-world or simulated autonomous vehicle 102 may be controlled using a specific implementation of vehicle components including a particular planner, sensors, vehicle controllers, actuators, drive system components, etc. The driving maneuver test data 236 may indicate vehicle tracking errors associated with different driving maneuvers, indicating divergences between the planned trajectory and the driven trajectory of the autonomous vehicle 102 when performing various driving maneuvers at various speeds, in various driving conditions, etc. These vehicle tracking errors may be based on the one or more of the vehicle control components used to control the vehicle(s) when generating the driving maneuver test data 236. Accordingly, when the performance modeling system 202 is run based on the driving maneuver test data 236, the output of the collision probability component 234 may represent a predicted collision probability 238 (and/or predicted collision probability rate) for an autonomous vehicle 102 using the same set of vehicle control components when operating in the real-world driving environments consistent with the log data 206.

Figure 2C:
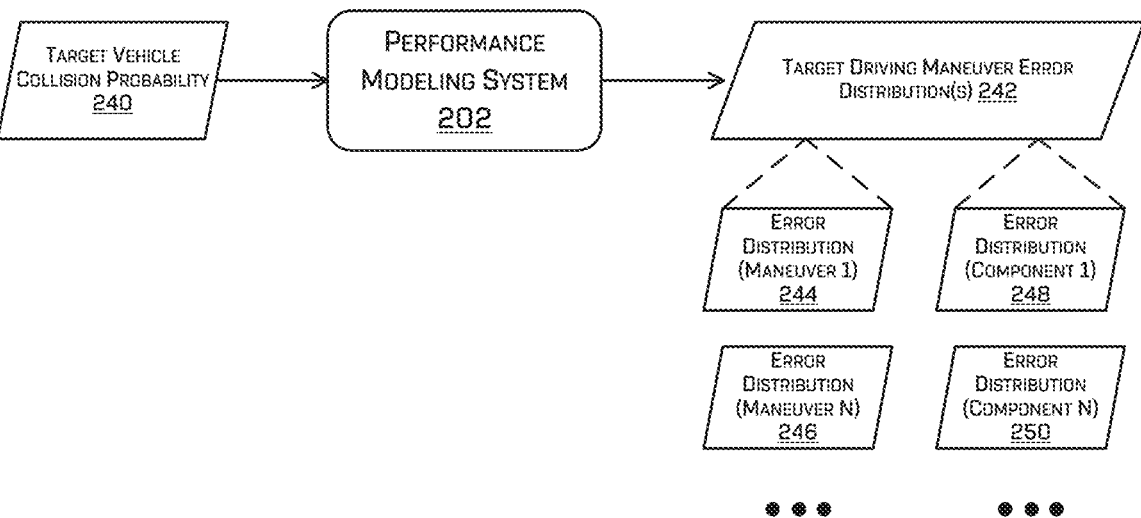
FIG. 2C depicts another example system in which a performance modeling system is used to determine corresponding target driving maneuver error distributions based on an overall target vehicle collision probability, in accordance with one or more examples of the disclosure.

Referring now to FIG. 2C, another example system is shown in which the performance modeling system 202 may be used to determine a target error distributions associated with various driving maneuvers and/or various vehicle control components, based on an overall target vehicle collision probability (or target vehicle collision rate). In this example, the target vehicle collision probability 240 may represent an overall goal collision probability for an autonomous vehicle 102. Based on the target vehicle collision probability 240, the performance modeling system 202 may use determine (e.g., using a trial-and-error process) the corresponding target driving maneuver error distribution(s) 242 that should cause the autonomous vehicle 102 to achieve the overall target vehicle collision probability 240. For instance, based on the target vehicle collision probability 240 (e.g., vehicle safety metrics data 222) the performance modeling system 202 may determine an initial set of estimated driving maneuver error distributions, and then determine whether the estimated driving maneuver error distributions would achieve the target vehicle collision probability 240. Based on whether or not an estimated set of driving maneuver error distributions would achieve the target vehicle collision probability 240, the estimations of the driving maneuver error distributions may be adjusted up or down, until the target driving maneuver error distribution(s) 242 that correspond to the target vehicle collision probability 240 are determined.

As shown in FIG. 2C, the performance modeling system 202 can be used to determine one set or multiple alternative sets of target driving maneuver error distribution(s) 242, to correspond to an overall target vehicle collision probability 240. As an example, if a first error rate or distribution for a first type of vehicle tracking error increases (e.g., for low-speed stopping maneuvers), but a different error rate or distribution for a different type of vehicle tracking error decreases (e.g., for high-speed swerving maneuvers), the increase and decrease may potentially cancel each other out, resulting in the same overall vehicle collision probability or rate. Similarly, multiple different sets of error rate or distributions for different driving maneuvers and/or different vehicle control components can correspond to the same overall target vehicle collision probability 240. In this example, the performance modeling system 202 may be used to determine a first error distribution 244 for a first driving maneuver, a second error distribution 246 for a second driving maneuver, and so on, which cumulatively correspond to the target vehicle collision probability 240. However, as noted above, there may be multiple different combinations of error distributions for the various driving maneuvers that correspond to the same target vehicle collision probability 240, and the performance modeling system 202 may be used to determine any number of such combinations. Additionally or alternatively, the performance modeling system 202 may be used to determine a first error distribution 248 for a first vehicle control component (e.g., a planner, a perception component, a sensor, a vehicle controller, an actuator, or any combination thereof, etc.), and a second error distribution 250 for a second vehicle control component, and so on. As in the previous example, there may be multiple different combinations of error distributions for the various vehicle control components that will correspond to the same target vehicle collision probability 240, and the performance modeling system 202 may be used to determine any number of such combinations.

Figure 3:
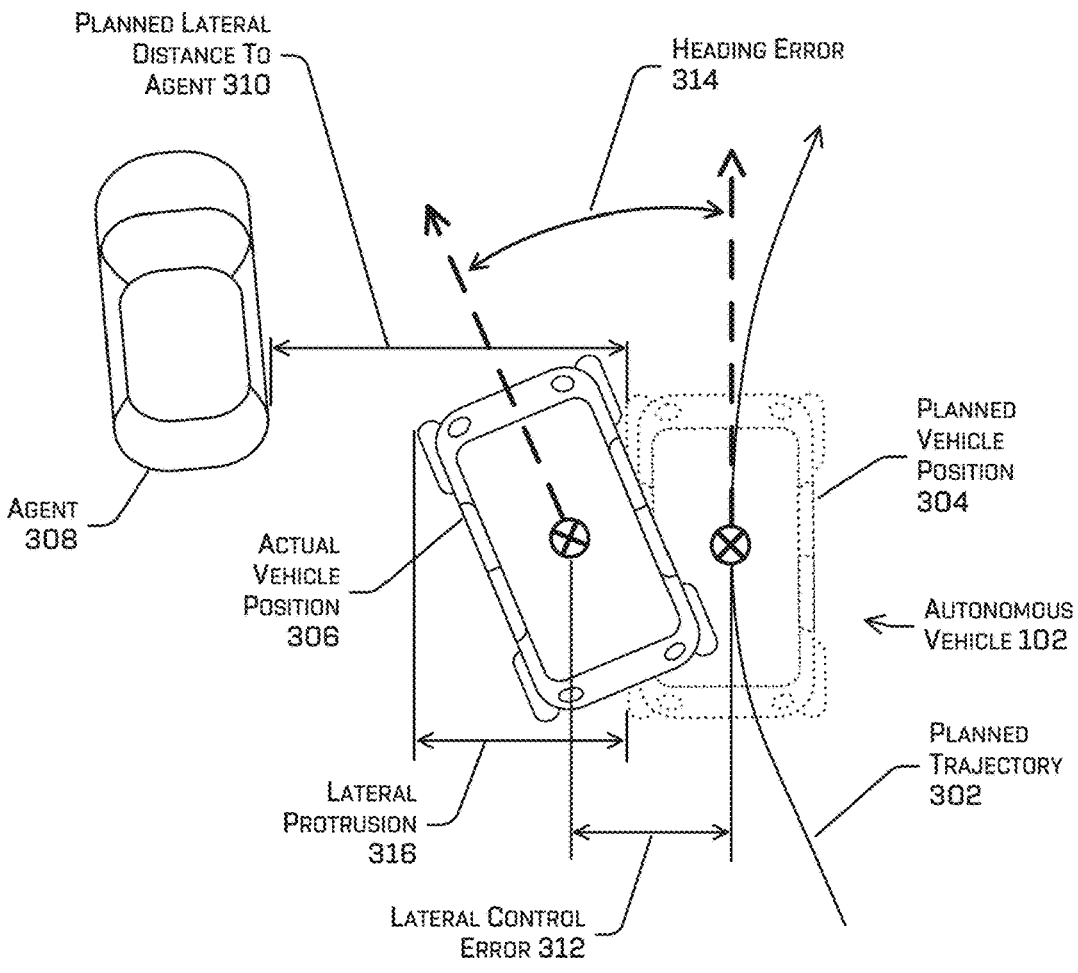
FIG. 3 is a diagram depicting tracking error and lateral protrusion of a vehicle following a planned trajectory, in accordance with one or more examples of the disclosure.

FIG. 3 shows a diagram 300 depicting an example of vehicle tracking error and corresponding lateral protrusion of a vehicle relative to a planned trajectory. As discussed above, a tracking error may refer to the deviation of an autonomous vehicle from its planned trajectory. In various examples, the actual (or driven trajectory) followed by an autonomous vehicle 102 may deviate from its planned trajectory for any number of reasons, including errors or degradations in vehicle controllers and related components (e.g., actuators, drive system components, etc.), disturbances or irregularities in the driving environment may affect the vehicle controllers and drive systems, disturbances or irregularities in the driving environment, sensor or localization errors, and the like. Tracking errors may be measured or otherwise determined in terms of distance, velocity, acceleration, heading, or other vehicle state data. For instance, although examples herein may describe determining collision probabilities using position-based tracking errors (e.g., lateral and/or longitudinal tracking error distance), in other examples, similar or identical techniques may be used to determine collision probabilities based on velocity tracking errors, acceleration tracking errors, heading tracking errors, etc.

As shown in FIG. 3, position-based tracking errors may include various different positional components. In this example, an autonomous vehicle 102 attempting to follow a planned trajectory 304 has deviated from the planned trajectory in the direction of a nearby agent 308. Position 304 represents the planned position of the autonomous vehicle 102 when following the planned trajectory 302, while position 306 represents the actual position of the autonomous vehicle 102 as it has deviated from the planned trajectory 302. Distance 310 corresponds to the planned lateral distance between the autonomous vehicle 102 and the agent 308 while following the planned trajectory 302. Based on the deviation between the planned position 304 and the actual position 306 of the autonomous vehicle 102, the vehicle has a lateral control error 312 and a heading error 314. The autonomous vehicle 102 also has a lateral protrusion 316, which is different from the lateral control error 312 in this example due to the heading error 314.

Figure 4A:
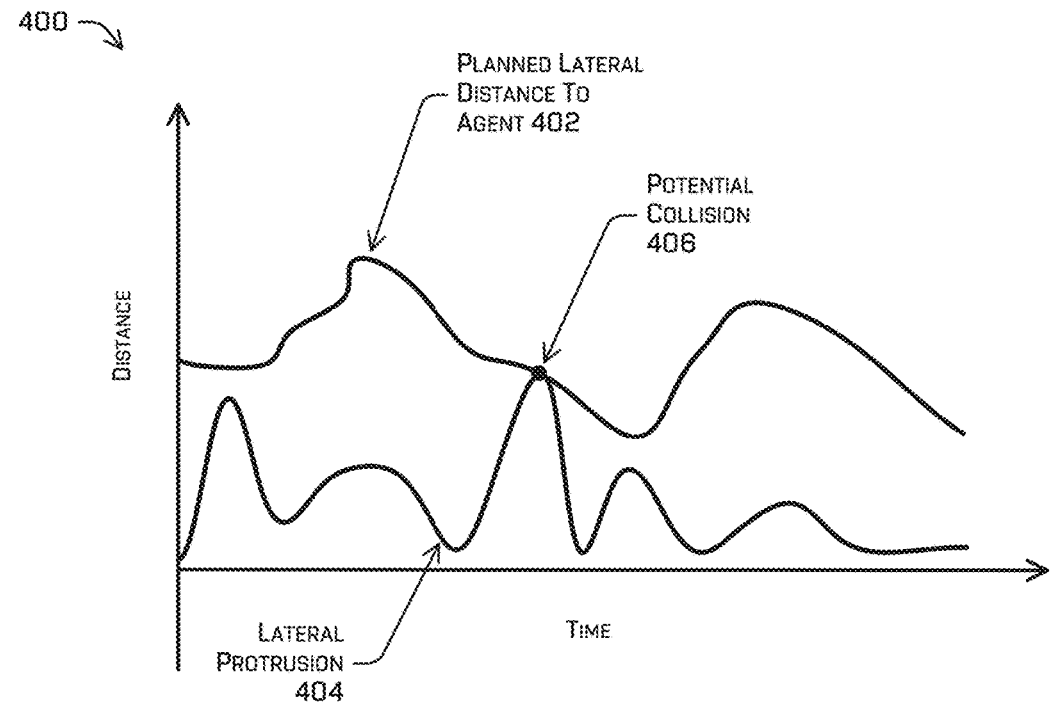
FIG. 4A is an example diagram depicting an overlap between a planned lateral distance to agent graph and a lateral protrusion graph, in accordance with one or more examples of the disclosure.

FIG. 4A shows an example graph 400 depicting a situation in which a potential collision may occur based on lateral tracking error while a vehicle is following a planned trajectory. In this example, line 402 represents the planned lateral distance between the vehicle and an agent (e.g., distance 310) over a period of time during the planned trajectory.

Line 404 represents the lateral protrusion of the vehicle over the same period of time while the vehicle is attempting to follow the planned trajectory. As shown in this example, at any time when the lateral protrusion of the vehicle (in the direction of the agent) exceeds the planned lateral distance between the vehicle and the agent, a potential collision 406 may occur.

Figure 4B:
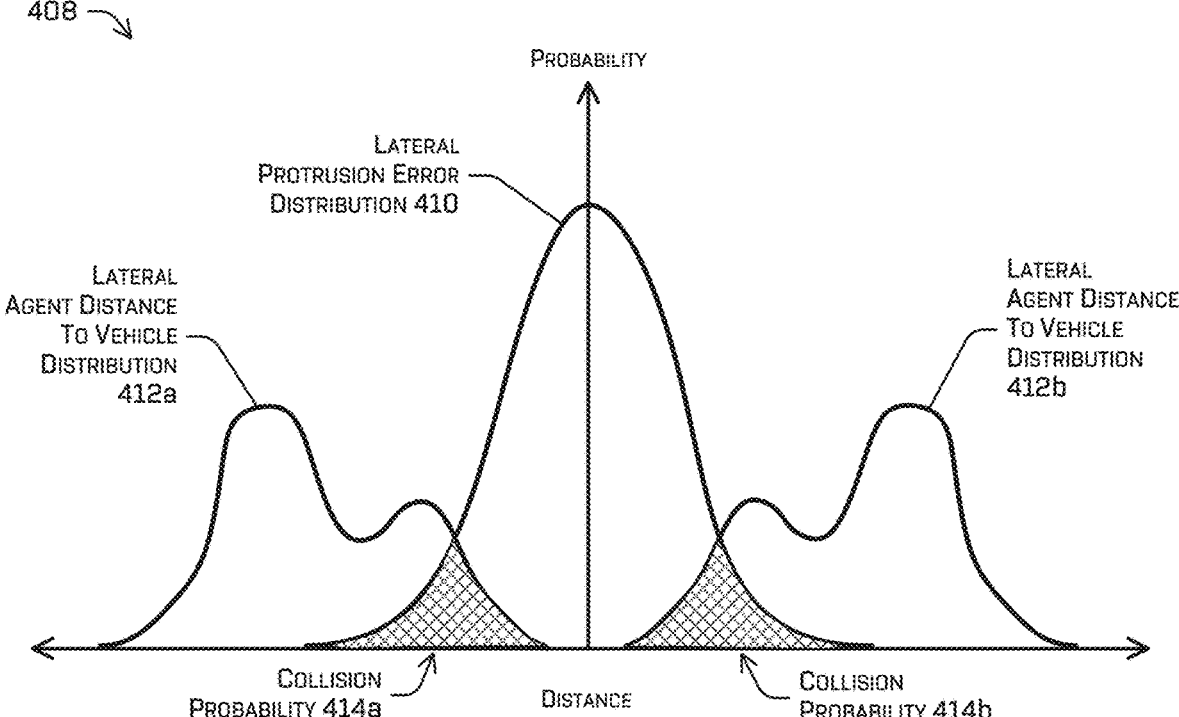
FIG. 4B is an example diagram depicting an overlap between a lateral position error distribution graph and an agent distance to vehicle distribution graph, in accordance with one or more examples of the disclosure.

FIG. 4B shows an example diagram 408 depicting a distribution 410 of lateral protrusion error, and a second distribution 412 representing lateral agent distance to the vehicle. Distribution 410 may be similar or identical to the distribution 218 and may represent a data-driven distribution of objects detected within log data relative to the vehicles that captured the log data (e.g., a lateral distance from the planned trajectory of the ego vehicle). Distribution 412 may be similar or identical to the distribution 230 and may represent vehicle tracking errors associated with one or more vehicle control components of an autonomous vehicle. As shown in this example, the distribution 412 may include two separate components/functions: a first lateral agent distance distribution 412a in one lateral direction, and a second lateral agent distance distribution 412b in the opposite lateral direction. As described above, a collision probability component 234 may use the lateral protrusion error distribution 410 and the lateral agent distance to vehicle distribution 412 to determine predicted collision probabilities for the autonomous vehicle. In this example, the predicted collision probability 414 (of collisions resulting from lateral tracking error) may be represented as the overlapping region between the lateral protrusion error distribution 410 and the lateral agent distance to vehicle distribution 412. As shown in this example, the predicted collision probability 414 may be the sum of two separate predicted collision probabilities 414a (e.g., instances when the left-side lateral error protrusion overlaps left-side lateral agent distance 412a) and 414b (e.g., instances when the right-side lateral error protrusion overlaps right-side lateral agent distance 412b).

In some examples, the collision probability component 234 may compute the probability of collisions caused by lateral protrusion using Equation 1 below:

$$
\begin{aligned}
&P(X > 0) = \\
&P(lat.\text{agent long.close})P(A \le E_{protrusion} \,|\, lat.\text{agent long.close}) = \\
&\qquad P(lat.\text{agent long.close}) \int_0^\infty \int_0^e f_A(a) f_E(e)\, da\, de,
\end{aligned}
$$

Equation 1

In Equation 1:
- $P(X{>}0){=}P(X(t){>}0)$ represents the probability of at least one collision during time t.
- P(lat. agent long. close) represents the probability of an agent being longitudinally sufficiently close and lateral to the vehicle (e.g., close enough longitudinally so that lateral protrusion is capable of causing a collision).
- P(A; E|lat. agent long. close) represents the probability that the distance between the vehicle and the object, A, is less than or equal to the protrusion (E) given that the agent is longitudinally sufficiently close and lateral to the vehicle.
- $A{=}A(t)$ represents a random variable related to the absolute distance between the position of the vehicle (e.g., the bounding box of the vehicle) centered on the planned trajectory and the bounding box of the agent.
- $E_{protrusion}{=}E_{protrusion}(t)$ represents the random variable related to the absolute lateral protrusion $e_{protrusion}$.

$f_A(a)$ represents the probability density function (PDF) of the absolute distance a between the position (e.g., bounding box) of the vehicle centered on the planned trajectory and the bounding box of the agent, given that agent is longitudinally sufficiently close and lateral to the vehicle.

$f_E(e)$ represents the probability density function of the absolute lateral protrusion e. The probability density function may be set to be half normal.

Additionally, the collision probability component 234 may compute the expected rate of collisions caused by lateral protrusion using Equations 2-5 below:

$$E(X(t)) = \lambda t, \qquad\qquad \text{Equation 2}$$

$$P(X(t) = k) = e^{-\lambda t}\frac{(\lambda t)^k}{k!}, \qquad \text{Equation 3}$$

$$P(X(t) > 0) = 1 - e^{-\lambda t}. \qquad \text{Equation 4}$$

$$\lambda = -\frac{\ln(1 - P(X(t) > 0))}{t}. \qquad \text{Equation 5}$$

Equations 2-5 may be used to show that the number of collisions X(t) is a Poisson process characterized by expectation and probability. In these examples:
- $\lambda$ represents the expected collision rate.
- Equation 2 states that the expected number of collisions is equal to the rate expected collision rate multiplied by time t.
- Equation 3 computes the probability of k collision events by time t.
- Equation 4 computes the probability of at least one hazardous event. In Equation 4, the probability P(X(t) >0) may be calculated as derived above and related to an expected rate.
- Equation 5 computes the expected rate.

In some examples, the collision probability component 234 may use Equations 6-10 below to determine tracking error requirements based on an overall set of performance safety benchmarks provided for the autonomous vehicle 102:

$$f_E(e; \sigma_E) = \frac{\sqrt{2}}{\sigma_E\sqrt{\pi}} = \frac{\sqrt{2}}{\sigma_E\sqrt{\pi}} e^{-\frac{(e)^2}{2\sigma_E^2}} \quad \text{Equation 6}$$

$$f_{E,A}(e, a; \sigma_E) = f_E(e; \sigma_E) f_A(a) \qquad \text{Equation 7}$$

$$P(A \le E_{protrusion}; \sigma_E) = \int_0^\infty \int_0^e f(a, e; \sigma_E)\, da\, de \qquad \text{Equation 8}$$

$$P(X > 0; \sigma_E) = P(lat.\text{agent long.close})P(A \le E_{protrusion}; \sigma_E) \quad \text{Equation 9}$$

$$\lambda(\sigma_E) = -\frac{\ln(1 - P(X > 0; \sigma_E)}{t}. \qquad \text{Equation 10}$$

In this example, Equations 6-10 may be used to calculate the tracking error requirements (e.g., a maximum lateral protrusion) that correspond to particular collision probabilities (including stochastic modeling). In these examples:
- PDF, $f_A$ may represent the distribution of the lateral distance to the desired trajectory over all lateral agents.
- P(lat. agent long. close) may represent the probability of an agent being present laterally
- Equations 6-10 may be performed in a loop until a desired collision rate (e.g., $\lambda_{target}{=}10^{-8}$ h$^{-1}$) has been reached.
- Equation 6, assuming an absolute lateral protrusion half normal distribution with standard deviation (STD) of $\sigma_E$, may define the STD such that it coincides with that of the related normal distribution of the "non-absolute" lateral protrusion).

Equation 7 may be used to calculate the joint probability distribution of lateral protrusion and lateral agent distance, related to the half normal distribution with STD $\sigma_E$.

Equation 8 may be used to calculate the related probability of overlapping lateral distances as follows, related to the half normal distribution with STD $\sigma_E$.

Equation 9 may be used to calculate the related collision probability.

Equation 10, with $t=T_{total}$ as the total amount of time in the queried data, may be used to estimate the collision rate using Poisson. $\sigma_E$ may be set as the required STD for the absolute lateral protrusion.

Further, in some examples, the collision probability component 234 may use Equations 11-13 to break a tracking error requirement (e.g., a maximum lateral protrusion) into lateral errors and heading errors:

$$f_E(e) = \frac{2}{L} \int_0^e f_{Y,\Psi}\left(y, \frac{2(e-y)}{L}; \sigma_Y, \sigma_\Psi\right) dy, \quad \text{Equation 11}$$

$$P(A < E; \sigma_E) \geq P(A < E; \sigma_Y, \sigma_\Psi). \quad \text{Equation 12}$$

$$\int_0^\infty \int_0^\infty f_A(a) f_E(e; \sigma_E) da\, de \geq \qquad \text{Equation 13}$$
$$\frac{2}{L} \int_0^\infty \int_0^e \int_0^e f_A(a) f_{Y,\Psi}\left(y, \frac{2(e-y)}{L}\right) dy\, da\, de,$$

In these examples:

Equation 11, under small angle approximations, may be used to express the PDF related to the absolute lateral protrusion (represented as $f_E$) as the joint PDF of the lateral error and heading error (represented as $f_{Y,\Psi}$).

$f_{Y,\Psi}$ may follow the bivariate half normal distribution of the absolute lateral error and heading error, respectively, with STD $\sigma_Y$ and $\sigma_\Psi$. As described above, the STDs may coincide with those of the related normal distribution of the "non-absolute" errors.

Equation 12 may be used to meet the upper bound on the collision rate, with a goal of selecting $\sigma_Y$ and $\sigma_\Psi$ in accordance with Equation 12.

In this example, the goal may represent the probability of a contact between the vehicle and an agent as a result of the permissible lateral control and heading errors being less than or equal to the corresponding probability related to the permissible lateral protrusion.

Equation 13 is thus equivalent to the inequality of Equation 12, which may be used for the tracking error requirement calculation.

Figure 5A:
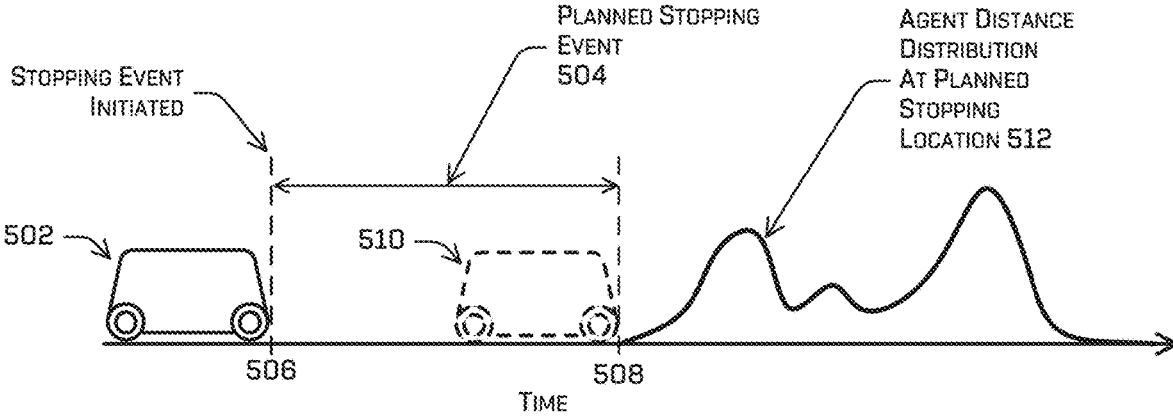
FIGS. 5A-5C illustrate an example technique for comparing target collision rate based on longitudinal position error distributions for a vehicle controller performing a stopping event, in accordance with one or more examples of the disclosure.
Figure 5B:
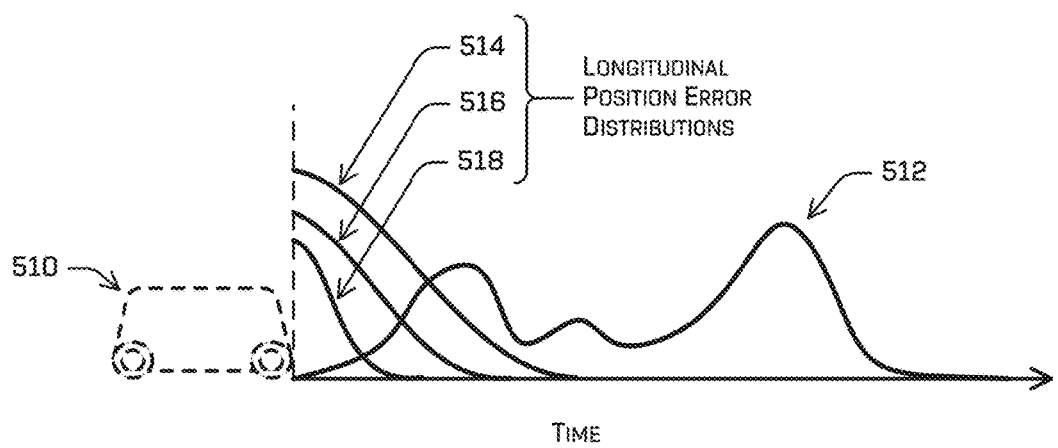
Figure 5C:
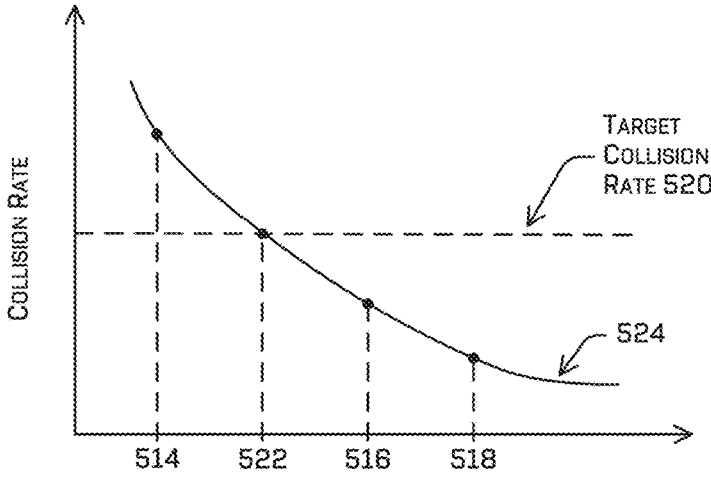

FIGS. 5A-5C illustrate an example technique for determining and analyzing component target collision rates based on longitudinal position error distributions for a vehicle controller associated with a particular driving maneuver (e.g., when performing a stopping event). In this example, the performance modeling system 202 may be used to perform various techniques described herein, including determining a first data-driven distribution of longitudinal distance between a vehicle and an agent, and determining a second longitudinal tracking error distribution associated with an autonomous vehicle (e.g., a longitudinal position error distribution).

In FIG. 5A, an autonomous vehicle 502 is depicted performing a stopping event 504 determined in accordance with a planned trajectory. According to the planned trajectory, the autonomous vehicle 502 may initiate the stopping event at time 506 (which, in other examples, may be defined in the trajectory as a position rather than or in addition to a time), and is planned to complete the stopping event at time 508 (e.g., at corresponding position 510). The distribution 512 represents a distribution determined by the performance modeling system 202, based on ground truth log data 206 associated with any number of vehicles, of the longitudinal distance between the vehicle 204 that captured the log data and the nearest agent in front of the vehicle at the completion of the stopping event.

FIG. 5B illustrates three different possible tracking error distributions (e.g., front-facing longitudinal position error distributions) that may cause the stopping position of the autonomous vehicle 502 to deviate from the planned stopping position 510. In this example, distribution 514 represents a larger (e.g., wider and taller) longitudinal error distribution, distribution 516 represents a smaller (e.g., narrower and shorter) longitudinal error distribution, and distribution 518 represents another still smaller longitudinal error distribution. As shown in FIG. 5B, larger longitudinal tracking error distributions may generally result in greater overlapping portions with the vehicle-to-agent distance distribution 512, thereby resulting in larger collision probabilities.

FIG. 5C depicts a graph illustrating an example relationship 524 between longitudinal tracking error distributions and corresponding collision rates. As shown in this example, the first longitudinal error distribution 514 may correspond to a greater collision probability, the second longitudinal error distribution 516 may correspond to a somewhat smaller collision probability, and the third longitudinal error distribution 518 may correspond to a still smaller collision probability. Thus, the graph in FIG. 5C may be used to determine when a target collision rate 520 (e.g., and/or other safety benchmarks) is likely to be achieved for the autonomous vehicle in stopping situations, both by determining whether particular tracking error distributions are likely to cause the autonomous vehicle to achieve the target collision rate, and by determining the tracking error distribution 522 (and/or multiple different tracking error distributions) that correspond precisely to the target collision rate.

In some examples, the tracking error distributions illustrated in FIGS. 5A-5C may represent error distributions when including all stopping events performed by a vehicle. However, in other examples, the partitioning or filtering techniques may be used to perform the analyses shown in FIGS. 5A-5C for a smaller subset of stopping events, such as stopping events falling within a particular range of initial vehicle speeds, stopping events performed in particular driving conditions/road conditions, stopping events performed within particular driving environments or regions, etc. As described above, as the filtering/partitioning of driving maneuvers becomes increasingly granular, the performance modeling system 202 may more accurately determine the tracking error distributions and corresponding collision probabilities associated with the specific granular driving maneuvers. Additionally, although this example relates to a particular driving maneuver (e.g., a stopping event) and a particular type of tracking error (e.g., longitudinal position error), in other examples, similar or identical techniques may be used for any other driving maneuver and/or tracking error type described herein.

Figure 6A:
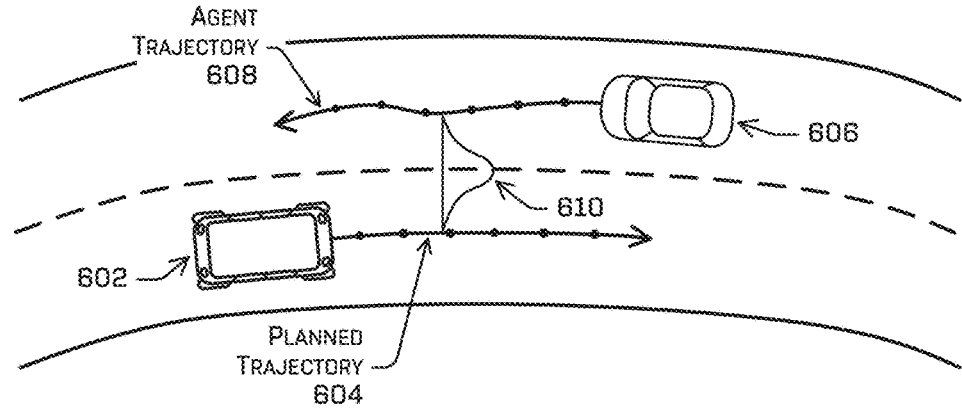
FIGS. 6A-6C illustrate an example technique for comparing a target collision rate with collision rates based on lateral position error distributions for a vehicle controller controlling an autonomous vehicle to traverse a planned trajectory, in accordance with one or more examples of the disclosure.
Figure 6B:
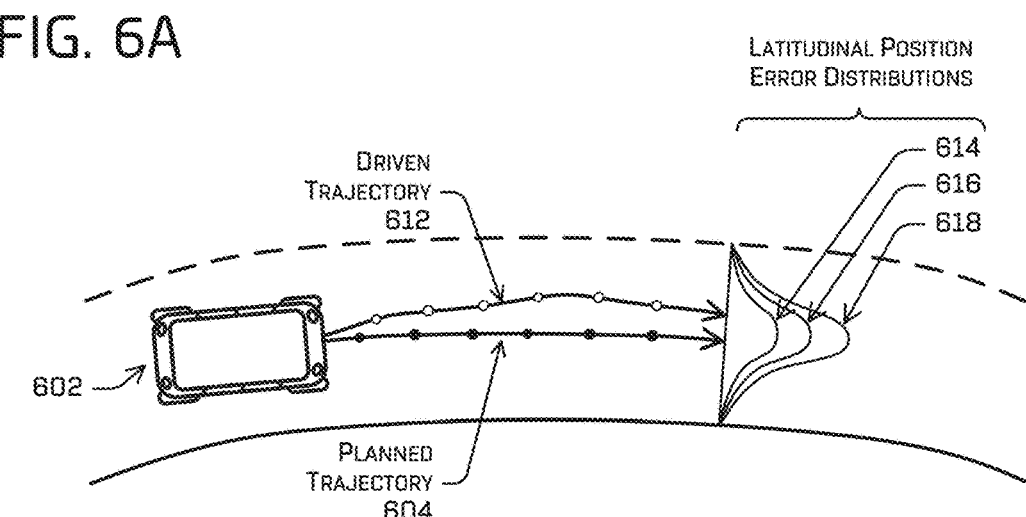
Figure 6C:
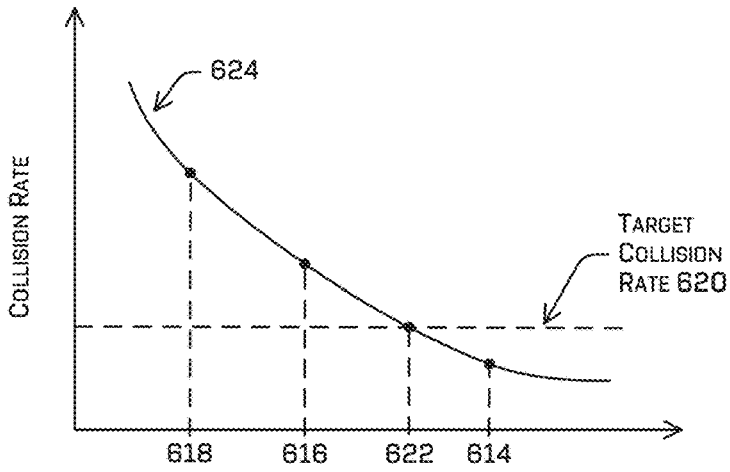

FIGS. 6A-6C illustrate another example technique for determining and analyzing component target collision rates based on latitudinal position error distributions for a vehicle controller associated with a particular driving maneuver (e.g., when driving on a curved road). In this example, the performance modeling system 202 may be used to perform various techniques described herein, including determining a first data-driven distribution of latitudinal distance between a vehicle and an agent, and determining a second latitudinal tracking error distribution associated with an autonomous vehicle (e.g., a latitudinal position error distribution).

In FIG. 6A, an autonomous vehicle 602 is depicted performing a curved-road driving maneuver in accordance with a planned trajectory 604. According to the planned trajectory 604, the autonomous vehicle 602 may proceed along the curved roadway to pass an oncoming agent 606 following a predicted agent trajectory 608. The distribution 610 represents a distribution determined by the performance modeling system 202, based on ground truth log data 206 associated with any number of vehicles, of the latitudinal distance between the vehicle 204 that captured the log data and the nearest lateral agent in an oncoming lane while driving on a two-lane (e.g., no median) road.

FIG. 6B illustrates three different possible tracking error distributions (e.g., latitudinal position error distributions) that may cause the driven trajectory 612 of the autonomous vehicle 602 to deviate from the planned trajectory 604. In this example, distribution 614 represents a smaller latitudinal error distribution, distribution 616 represents a larger latitudinal error distribution, and distribution 618 represents another still larger latitudinal error distribution. As shown in FIG. 6B, larger latitudinal tracking error distributions may generally result in greater likelihoods of the driven trajectory 612 approaching the agent trajectory 608, thereby resulting in larger collision probabilities.

FIG. 6C depicts a graph illustrating an example relationship 624 between latitudinal tracking error distributions and corresponding collision rates. As shown in this example, the first longitudinal error distribution 614 may correspond to a lower collision probability, the second latitudinal error distribution 616 may correspond to a somewhat larger collision probability, and the third latitudinal error distribution 618 may correspond to a still larger collision probability. Thus, the graph in FIG. 6C may be used to determine when a target collision rate 620 (e.g., and/or other safety benchmarks) is likely to be achieved for curved road two-lane driving situations, both by determining whether particular tracking error distributions are likely to cause the autonomous vehicle to achieve the target collision rate, and by determining the tracking error distribution 622 (and/or multiple different tracking error distributions) that correspond precisely to the target collision rate. In various examples, when determining tracking error distribution(s) 622 to correspond to a target collision probability or rate, the performance modeling system 202 may be configured to determine normal distributions. Alternatively, the performance modeling system 202 may determine distributions having size, shape, and/or function characteristics based on previously determined tracking error distributions for the same or similar vehicle control components.

Figure 7A:
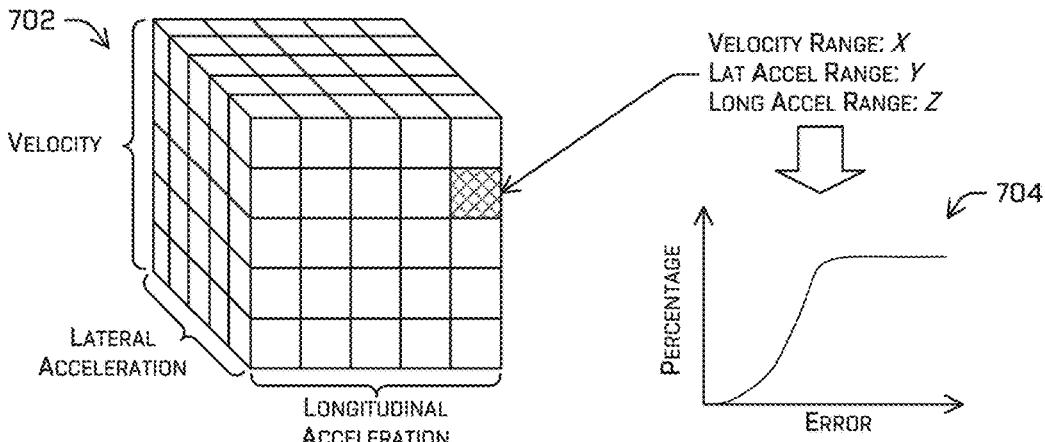
FIGS. 7A-7C illustrate an example technique for determining collision probabilities associated with a driving maneuver velocity and acceleration ranges, in accordance with one or more examples of the disclosure.
Figure 7B:
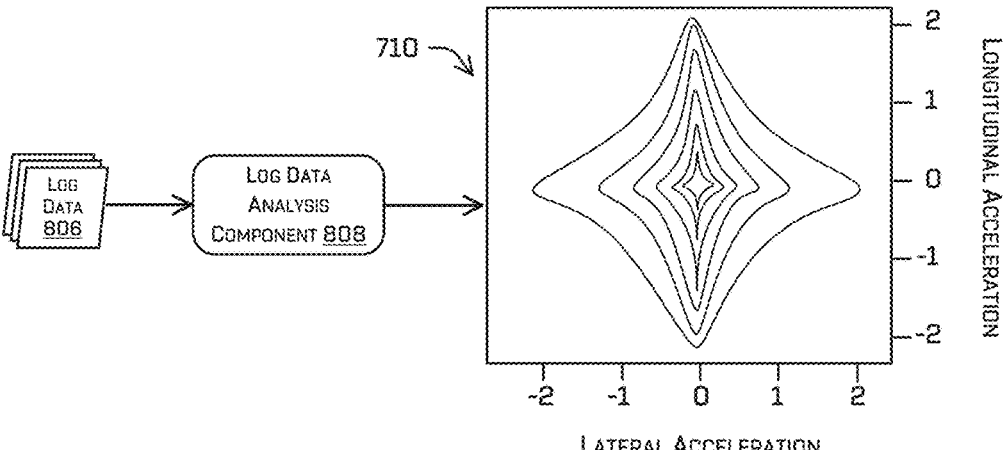
Figure 7C:
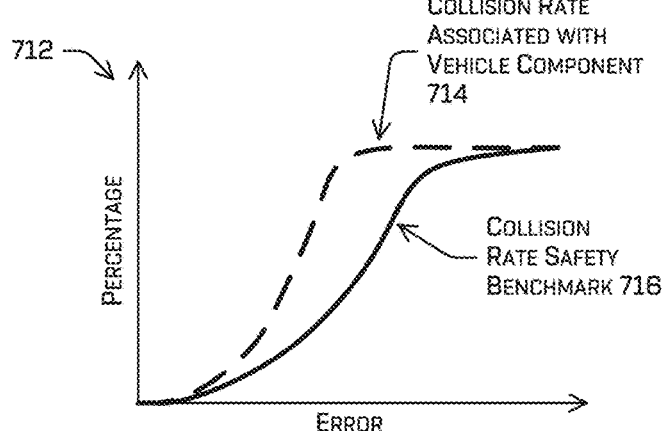

FIGS. 7A-7C illustrate example techniques for determining collision rates associated with different partition ranges of driving maneuvers, defined by different ranges of velocities and accelerations. As described above, various techniques may be used to determine overall tracking error distributions and corresponding overall collision probabilities associated with the vehicle controllers (and/or associated components) of an autonomous vehicle. Additionally or alternatively, the techniques described herein may include filtering/partitioning to determine tracking error distributions and corresponding collision probabilities associated with particular driving maneuvers. In some examples, such driving maneuvers may represent particular driving scenarios or situations, such as single- or double-lane change driving maneuvers, left- or right-turn driving maneuvers, straight-line highway driving maneuvers, and the like. However, as shown in this example, driving maneuvers also may be defined in terms of partition ranges of velocities, lateral accelerations, and/or longitudinal accelerations.

In this example, FIG. 7A depicts a cube 702 defining an example set of partition ranges of driving maneuvers. Each partition range in the cube 702 may be associated with a first range of velocities, a second range of lateral accelerations, and a third range of longitudinal accelerations. For each particular partition range within the cube 702, the performance modeling system 202 may determine (or receive) a tracking error distribution associated with the particular partition range. In some examples, the tracking error distributions may be determined based on closed-course test driving maneuvers, simulation or component testing, and/or other techniques described herein. For each partition range, the performance modeling system 202 also may determine a corresponding collision rate based on the tracking error distribution.

FIG. 7B depicts the performance modeling system 202 retrieving and analyzing ground truth log data 706, using a log data analysis component 708, to determine how prevalent each partition range of driving maneuver is within the log data 706. For example, for a partition range corresponding to a first velocity range, a second lateral acceleration range, and a third longitudinal acceleration range, the log data analysis component 708 may identify how often (based on the ground truth log data 706), the autonomous vehicle is expected to operate within the partition range. The example heat map 710 indicates the relative amounts of driving that are performed within different velocity/acceleration partition ranges.

FIG. 7C depicts a collision rate performance graph 712, based on an aggregation of all of the individual partition range collision rates. In this example, graph 712 depicts an aggregated collision rate 714 associated with the vehicle controllers (e.g., based on an aggregation of all partition rate collision rates within the cube 702), in comparison to a collision rate safety benchmark 716.

Figure 8:
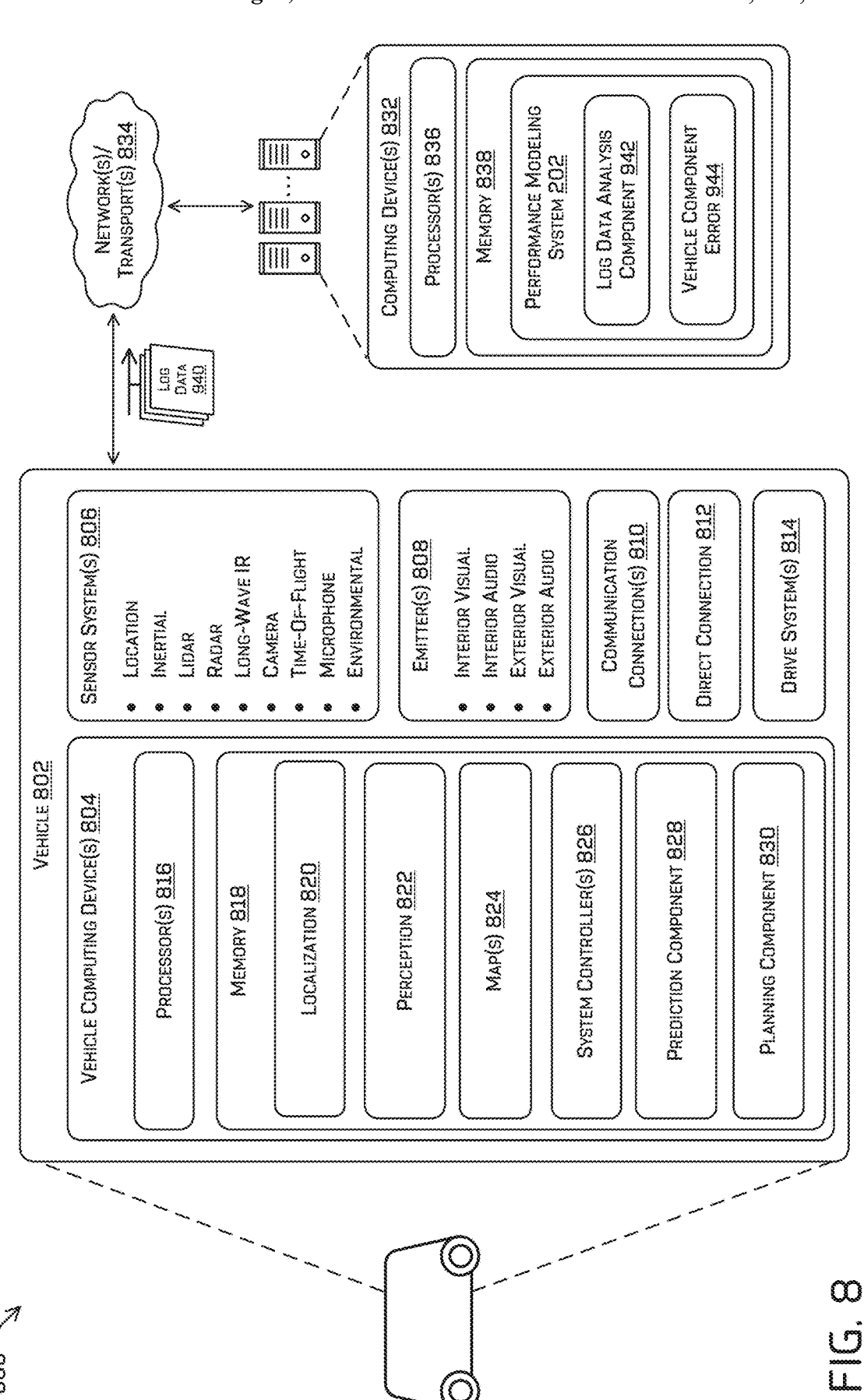
FIG. 8 depicts a block diagram of an example system for implementing various techniques described herein.

FIG. 8 illustrates an example computing environment 800 that may be used to implement the techniques described herein for determining collision probabilities and/or collision rates associated with vehicle controllers of autonomous vehicles, including determining data-driven distributions of distances between the vehicles and other objects in various driving environments, and tracking error distributions associated with vehicle controllers controlling autonomous vehicles to execute planned trajectories. In this example, the computing environment 800 includes a vehicle 802 and computing device(s) 832 configured to execute a performance modeling system 202 for determining collision probabilities and/or collision rates associated with vehicle controllers and/or other autonomous vehicle components.

The vehicle 802 may include various software-based and/or hardware-based components of an autonomous vehicle, and may be used to control autonomous vehicles traversing through physical environments and/or simulated vehicles operating in driving simulations. The vehicle 802 may be similar or identical to any or all of the real and/or simulated vehicles or vehicle controllers described herein. The computing device(s) 832 may be similar or identical to the computing devices of the performance modeling systems 202 and/or its various related components and systems described above in reference to FIGS. 1-7. In some examples, the vehicle 802 may correspond to a vehicle traversing a physical environment, capturing and storing log data 206 which may be provided to the computing device(s) 832 and used to determine data-driven object distance to vehicle distributions as described herein. Additionally or alternatively, the vehicle 802 may receive and execute components from the computing device(s) 832, such as collision probabilities that may be used to determine optimal planned trajectories. Further, the vehicle 802 may be an autonomous vehicle operating in a real-world driving environment, or a simulated vehicle operating in a simulated driving environment.

In at least one example, the vehicle 802 may correspond to an autonomous or semi-autonomous vehicle configured to perform object perception and prediction functionality, route planning and/or optimization. The example vehicle 802 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 802 can be configured to control all functions from start to completion of the trip, including all parking functions, it may not include a driver and/or controls for driving the vehicle 802, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 802 may include vehicle computing device(s) 804, sensor(s) 806, emitter(s) 808, communication connection(s) 810, at least one direct connection 812 (e.g., for physically coupling with the vehicle to exchange data and/or to provide power), and one or more drive system(s) 814. The vehicle 802 may correspond to the autonomous vehicles discussed in any of the examples above. The computing environment 800 may additionally or alternatively comprise vehicle computing device(s) 804.

In some instances, the sensor(s) 806 may include lidar sensors, radar sensors, ultrasonic transducers, sonar sensors, location sensors (e.g., global positioning system (GPS), compass,), inertial sensors (e.g., inertial measurement units (IMUs), accelerometers, magnetometers, gyroscopes,), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors,), etc. The sensor(s) 806 may include multiple instances of each of these or other types of sensors. For instance, the radar sensors may include individual radar sensors located at the corners, front, back, sides, and/or top of the vehicle 802. As another example, the cameras may include multiple cameras disposed at various locations about the exterior and/or interior of the vehicle 802. The sensor(s) 806 may provide input to the vehicle computing device(s) 804 and/or to computing device(s) 832.

The vehicle 802 may also include emitter(s) 808 for emitting light and/or sound, as described above. The emitter(s) 808 in this example may include interior audio and visual emitter(s) to communicate with passengers of the vehicle 802. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 808 in this example may also include exterior emitter(s). By way of example and not limitation, the exterior emitter(s) in this example include lights to signal a direction of travel or other indicator of vehicle action (e.g., indicator lights, signs, light arrays,), and one or more audio emitter(s) (e.g., speakers, speaker arrays, horns,) to audibly communicate with pedestrians or other nearby vehicles, one or more of which comprising acoustic beam steering technology.

The vehicle 802 may also include communication connection(s) 810 (e.g., network interface(s)) that enable communication between the vehicle 802 and one or more other local or remote computing device(s). For instance, the communication connection(s) 810 may facilitate communication with other local computing device(s) on the vehicle 802 and/or the drive systems(s) 814. Also, the communication connection(s) 810 may additionally or alternatively allow the vehicle to communicate with other nearby computing device(s) (e.g., other nearby vehicles, traffic signals, etc.). The communication connection(s) 810 may additionally or alternatively enable the vehicle 802 to communicate with computing device(s) 832. In some examples, computing device(s) 832 may comprise one or more nodes of a distributed computing system (e.g., a cloud computing architecture).

The communication connection(s) 810 may include physical and/or logical interfaces for connecting the vehicle computing device(s) 804 to another computing device or a network, such as network(s) and/or transport(s) 834. For example, the communication connection(s) 810 may enable Wi-Fi-based communication such as via frequencies defined by the IEEE 200.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 804 and/or the sensor(s) 806 may send sensor data, via the network(s) and/or transport(s) 834, to the computing device(s) 832 at a particular frequency, after a lapse of a predetermined period of time, in near real-time, etc.

In some instances, the vehicle 802 may include one or more drive systems(s) 814 (or drive components). In some instances, the vehicle 802 may have a single drive system 814. In some instances, the drive system(s) 814 may include one or more sensors to detect conditions of the drive system(s) 814 and/or the surroundings of the vehicle 802. By way of example and not limitation, the sensor(s) of the drive systems(s) 814 may include one or more wheel encoders (e.g., rotary encoders) to sense rotation of the wheels of the drive components, inertial sensors (e.g., inertial measurement units, accelerometers, gyroscopes, magnetometers) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive systems(s) 814. In some cases, the sensor(s) on the drive systems(s) 814 may overlap or supplement corresponding systems of the vehicle 802 (e.g., sensor(s) 806).'

The drive systems(s) 814 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive systems(s) 814 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive systems(s) 814. Furthermore, the drive systems(s) 814 may also include one or more communication connection(s) that enable communication by the respective drive component with one or more other local or remote computing device(s).

The vehicle computing device(s) 804 may include processor(s) 816 and memory 818 communicatively coupled with the one or more processors 816. Computing device(s) 832 may also include processor(s) 836, and/or memory 838. As described above, the memory 838 of the computing device(s) 832 may store and execute a performance modeling system 202 configured to determine the various distributions and collision probabilities described herein. As shown in this example, the memory 838 of the computing device(s) 832 also may store and/or execute various systems that may use the performance modeling system 202, such as a log data analysis component 842 (e.g., including object detection component 208, aggregation/filtering component 214, etc.) and a controller error component 844 (e.g., including a vehicle tracking error component 220, an aggregation and filtering component 228, etc.), and/or various other systems associated with the performance modeling system 202.

The processor(s) 816 and/or 836 may be any suitable processor capable of executing instructions to process data and perform operations or cause operations to be performed as described herein. By way of example and not limitation, the processor(s) 816 and/or 836 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 818 and/or 838 may be examples of non-transitory computer-readable media. The memory 818 and/or 838 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 818 and/or memory 838 may store a localization component 820, perception component 822, maps 824, system controller(s) 826, prediction component 828, and/or planning component 830.

In at least one example, the localization component 820 may include hardware and/or software to receive data from the sensor(s) 806 to determine a position, velocity, and/or orientation of the vehicle 802 (e.g., one or more of an x-, y-, z-position, roll, pitch, or yaw). For example, the localization component 820 may include map(s) of an environment and can continuously determine a location, velocity, and/or orientation of the autonomous vehicle within the map(s). In some instances, the localization component 820 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 820 may provide data to various components of the vehicle 802 to determine an initial position of an autonomous vehicle for generating a trajectory and/or for generating map data, as discussed herein. In some examples, localization component 820 may provide, to the planning component 830 and/or to the prediction component 828, a location and/or orientation of the vehicle 802 relative to the environment and/or sensor data associated therewith.

The memory 818 can further include one or more maps 824 that can be used by the vehicle 802 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In one example, a map can include a three-dimensional mesh generated using the techniques discussed herein. In some instances, the map can be stored in a tiled format, such that individual tiles of the map represent a discrete portion of an environment, and can be loaded into working memory as needed. In at least one example, the one or more maps 824 may include at least one map (e.g., images and/or a mesh) generated in accordance with the techniques discussed herein. In some examples, the vehicle 802 can be controlled based at least in part on the maps 824. That is, the maps 824 can be used in connection with the localization component 820, the perception component 822, and/or the planning component 830 to determine a location of the vehicle 802, identify objects in an environment, and/or generate routes and/or trajectories to navigate within an environment.

In some instances, the perception component 822 may comprise a primary perception system and/or a prediction system implemented in hardware and/or software. The perception component 822 may detect object(s) in an environment surrounding the vehicle 802 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 822 may be referred to as perception data.

In some examples, sensor data and/or perception data may be used to generate an environment state that represents a current state of the environment. For example, the environment state may be a data structure that identifies object data (e.g., object position, area of environment occupied by object, object heading, object velocity, historical object data), environment layout data (e.g., a map or sensor-generated layout of the environment), environment condition data (e.g., the location and/or area associated with environmental features, such as standing water or ice, whether it's raining, visibility metric), sensor data (e.g., an image, point cloud), etc. In some examples, the environment state may include a top-down two-dimensional representation of the environment and/or a three-dimensional representation of the environment, either of which may be augmented with object data. In yet another example, the environment state may include sensor data alone. In yet another example, the environment state may include sensor data and perception data together.

The prediction component 828 may include functionality to generate predicted information associated with objects in an environment. As an example, the prediction component 828 can be implemented to predict locations of a pedestrian proximate to a crosswalk region (or otherwise a region or location associated with a pedestrian crossing a road) in an environment as they traverse or prepare to traverse through the crosswalk region. As another example, the techniques discussed herein can be implemented to predict locations of other objects (e.g., vehicles, bicycles, pedestrians, and the like) as the vehicle 802 traverses an environment. In various examples, the prediction component 828 can generate one or more predicted positions, predicted velocities, predicted trajectories, etc., for such target objects based on attributes of the target object and/or other objects proximate the target object.

The planning component 830 may receive a location and/or orientation of the vehicle 802 from the localization component 820, perception data from the perception component 822, and/or predicted trajectories from the prediction component 828, and may determine instructions for controlling operation of the vehicle 802 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 826 and/or drive systems(s) 814 may parse/cause to be carried out, second instructions for the emitter(s) 808 may be formatted according to a second format associated therewith). In at least one example, the planning component 830 may comprise a nominal trajectory generation subcomponent that generates a set of candidate trajectories, and selects a trajectory for implementation by the drive systems(s) 814 based at least in part on determining a cost associated with a trajectory according to U.S. patent application Ser. No. 16/517,506, filed Jul. 19, 2019 and/or U.S. patent application Ser. No. 16/872,284, filed May 11, 2020, the entirety of which are incorporated herein for all purposes.

The memory 818 and/or 838 may additionally or alternatively store a mapping system (e.g., generating a map based at least in part on sensor data), a planning system, a ride management system, etc. Although localization component 820, perception component 822, the prediction component 828, the planning component 830, and/or system controller(s) 826 are illustrated as being stored in memory 818, any of these components may include processor-executable instructions, machine-learned model(s) (e.g., a neural network), and/or hardware and all or part of any of these components may be stored on memory 838 or configured as part of computing device(s) 832.

As described herein, the localization component 820, the perception component 822, the prediction component 828, the planning component 830, and/or other components of the computing environment 800 may comprise one or more ML models. For example, the localization component 820, the perception component 822, the prediction component 828, and/or the planning component 830 may each comprise different ML model pipelines. The prediction component 828 may use a different ML model or a combination of different ML models in different circumstances. For example, the prediction component 828 may use different GNNs, RNNs, CNNs, MLPs and/or other neural networks tailored to outputting predicted agent trajectories in different seasons (e.g., summer or winter), different driving conditions and/or visibility conditions (e.g., times when border lines between road lanes may not be clear or may be covered by snow), and/or based on different crowd or traffic conditions (e.g., more conservative trajectories in a crowded traffic conditions such as downtown areas, etc.). In various examples, any or all of the above ML models may comprise an attention mechanism, GNN, and/or any other neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), Ada-Boost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like.

Memory 818 may additionally or alternatively store one or more system controller(s) 826, which may be configured to control steering, propulsion, braking, safety, emitters, communication, and other systems of the vehicle 802. These system controller(s) 826 may communicate with and/or control corresponding systems of the drive systems(s) 814 and/or other components of the vehicle 802.

It should be noted that while FIG. 8 is illustrated as a distributed system, in alternative examples, components of the vehicle 802 may be associated with the computing device(s) 832 and/or components of the computing device(s) 832 may be associated with the vehicle 802. That is, the vehicle 802 may perform one or more of the functions associated with the computing device(s) 832, and vice versa.

FIG. 9 is a flow diagram illustrating an example process 900 for determining and evaluating the collision probabilities associated with a vehicle component (e.g., a lateral or longitudinal controller, actuators, drive system components, planner, sensors, and/or associated components used to control an autonomous vehicle), based on data-driven vehicle-object distance distributions, and vehicle tracking error distributions. As described below, process 900 may be performed by one or more computer-based components configured to implement various functionalities described herein. For instance, process 900 may be performed by the performance modeling system 202 including (or associated with) a log data analysis component 842 and a controller error component 844.

Process 900 is illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types. The order in which the operations are described should not be construed as a limitation. Any number of the described blocks can be combined in any order and/or in parallel to implement the processes, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

At operation 902, the performance modeling system 202 may receive tracking error distribution data associated with a vehicle component (e.g., controllers and/or additional associated components, such as actuators, drive system components, etc.). Additionally or alternatively, at operation 904, the performance modeling system 202 may determine the tracking error distribution(s) associated with the vehicle components.

As described above, tracking error refers to instances in which the actual driven trajectory of an autonomous vehicle deviates from its planned trajectory. The tracking error distributions received or determined in operations 902 and/or 904 may be tracking errors associated with a lateral vehicle controller, a longitudinal vehicle controller or both. In some examples, the tracking error distributions may be universal with respect to the vehicle components (e.g., distributions applicable to all driving activities). In other examples, the tracking error distributions may be associated with particular driving maneuvers, driving conditions and/or driving environments.

In operation 902, the received tracking error distributions may include error distributions previously determined for the vehicle components. In other examples, the tracking error distributions may represent hypothetical error distributions that may be used for the purpose of determining whether the hypothetical error distributions, if accurate, will cause the autonomous vehicle to achieve its overall safety and performance benchmarks. In contrast, in operation 904 the tracking error distributions may be determined, for example, experimentally based on driving maneuver tests, simulation testing, and/or component testing, etc.

At operation 906, the performance modeling system 202 may receive log data captured by vehicles 204, including data representing the distances between the vehicles 204 and various additional objects in the driving environments (e.g., agents, static objects, road features, etc.), at various times and/or when performing various driving maneuvers within the log data. At operation 908, the performance modeling system 202 may use the log data received in operation 906 to determine a vehicle-to-object distance distribution. As described herein, the distribution(s) determined in operation 908 may represent an overall distance distribution based on all of the log data records. Alternatively, different distribution(s) may be determined (e.g., by filtering and partitioning) for different driving maneuvers, driving conditions, and/or environments. Further, although some examples herein refer to vehicle-object distance distributions, in other examples, the data-driven distributions also may include distributions of agent-object relative velocity, relative acceleration, relative heading, etc.

At operation 910, the performance modeling system 202 may use the vehicle tracking error distribution received or determined in operation 902 and/or 904, and the data-driven vehicle-to-object distance distribution determined in operation 908, to determine a collision rate associated with the vehicle component(s) and/or related components. As described above, collision rate (and/or a collision probability) may represent overlapping portions of the two distributions, for example, where a lateral protrusion distribution overlaps a lateral object-agent distance distribution, and/or where a longitudinal protrusion distribution overlaps a longitudinal object-agent distance distribution.

At operation 912, the performance modeling system 202 may evaluate the collision rate determined in operation 910 with respect to one or more vehicle safety benchmarks. In this example, when the collision rate satisfies the vehicle safety benchmarks (912:Yes), the performance modeling system 202 may perform any number of downstream actions, including, at operation 914, validating the vehicle components and/or providing (e.g., transmitting) the components to one or more autonomous vehicles for use in real-world driving environments. As described above, in some cases, the validation in operation 914 may be for the component as a whole to operate on an autonomous vehicle. In other cases, the validation in operation 914 may be specific to a particular scenario (e.g., validation of predicted collision rate for a particular driving maneuver, within a particular driving environment, and in particular driving conditions, etc.). In contrast, when the performance modeling system 202 determines that the collision rate does not satisfy the vehicle safety benchmarks (912:No), the performance modeling system 202 may fail to validate the vehicle components for real-world use in autonomous vehicles.

EXAMPLE CLAUSES

A. A system comprising: one or more processors; and one or more non-transitory computer-readable media storing computer-executable instructions that, when executed, cause the one or more processors to perform operations comprising: receiving log data associated with a vehicle operating in an environment, the log data comprising a representation of an object in the environment proximate to the vehicle; determining, based at least in part on the log data, a first distribution representing a distance from the object to a planned trajectory of the vehicle, wherein the first distribution is associated with a first driving maneuver performed by the vehicle; determining a second distribution representing an error of a first vehicle component associated with using the first vehicle component to perform the first driving maneuver; determining, based at least in part on the first distribution and the second distribution, a predicted collision rate associated with performing the first driving maneuver using the first vehicle component; and transmitting, based at least in part on the predicted collision rate, the first vehicle component to an autonomous vehicle configured to use the first vehicle component to perform the first driving maneuver on the autonomous vehicle.

B. The system of paragraph A, wherein the first driving maneuver comprises at least one of: a stopping driving maneuver; a turning driving maneuver; a single lane change driving maneuver; or a double lane change driving maneuver.

C. The system of paragraph B, wherein the first driving maneuver further comprises at least one of: a speed associated with the first driving maneuver; or a driving condition associated with the first driving maneuver.

D. The system of paragraph A, wherein determining the second distribution comprises: determining a vehicle position error associated with the first driving maneuver performed by at least one of a test vehicle or a simulated vehicle operating the first vehicle component.

E. The system of paragraph A, wherein the second distribution is determined based at least in part on a target collision rate associated with the autonomous vehicle.

F. A method comprising: receiving log data associated with a vehicle operating in an environment, the log data comprising a representation of an object in the environment proximate to the vehicle; determining, based at least in part on the log data, a first distribution representing a distance from the object to a planned trajectory of the vehicle; determining a second distribution representing an error associated with a vehicle control operation performed by a vehicle component; determining, based at least in part on the first distribution and the second distribution, a predicted event rate associated with the vehicle component; and transmitting, based at least in part on the predicted event rate, the vehicle component to an autonomous vehicle configured to use the vehicle component to perform the vehicle control operation for the autonomous vehicle.

G. The method of paragraph F, wherein the second distribution comprises at least one of: a lateral position error distribution; or a heading error distribution, and wherein determining the first distribution comprises determining, based on the log data, a distribution of lateral distances between the planned trajectory of the vehicle and a plurality of objects represented in the log data.

H. The method of paragraph F, wherein the second distribution comprises at least one of: a longitudinal position error distribution; a longitudinal stopping distance error distribution; or a longitudinal velocity error distribution, and wherein determining the first distribution comprises determining, based on the log data, a distribution of longitudinal distances between the planned trajectory of the vehicle and a plurality of objects represented in the log data.

I. The method of paragraph F, wherein determining the first distribution comprises: determining a predicted perception error rate associated with a perception component of the vehicle; and modifying the first distribution based at least in part on the predicted perception error rate.

J. The method of paragraph F, wherein determining the second distribution comprises: determining a vehicle position error associated with a driving maneuver performed by at least one of a test vehicle or a simulated vehicle operating the vehicle component.

K. The method of paragraph F, wherein the second distribution is determined based at least in part on a target event rate associated with the autonomous vehicle.

L. The method of paragraph F, wherein the second distribution is associated with the error associated with performing the vehicle control operation within a first driving condition, and wherein determining the first distribution comprises determining, based on the log data, a distribution of distances between the planned trajectory of the vehicle and a plurality of objects within environments that include the first driving condition.

M. The method of paragraph F, wherein the second distribution comprises determining a joint distribution based at least in part on: a first lateral position error distribution; and a second longitudinal position error distribution, and wherein determining the first distribution comprises determining, based on the log data, a distribution of total distances between the planned trajectory of the vehicle and a plurality of objects represented in the log data.

N. The method of paragraph F, further comprising: determining a performance degradation associated with operation of the autonomous vehicle; and determining vehicle component performance data, based at least in part on the performance degradation and the second distribution, wherein a trajectory planner component is configured to determine a trajectory for controlling the autonomous vehicle, based at least in part on the vehicle component performance data.

O. One or more non transitory computer readable media storing instructions executable by a processor, wherein the instructions, when executed, cause the processor to perform operations comprising: receiving log data associated with a vehicle operating in an environment, the log data comprising a representation of an object in the environment proximate to the vehicle; determining, based at least in part on the log data, a first distribution representing a distance from the object to a planned trajectory of the vehicle; determining a second distribution representing an error associated with a vehicle control operation performed by a vehicle component; determining, based at least in part on the first distribution and the second distribution, a predicted event rate associated with the vehicle component; and transmitting, based at least in part on the predicted event rate, the vehicle component to an autonomous vehicle configured to use the vehicle component to perform the vehicle control operation for the autonomous vehicle.

P. The one or more non transitory computer readable media of paragraph O, wherein the second distribution comprises at least one of: a lateral position error distribution; or a heading error distribution, and wherein determining the first distribution comprises determining, based on the log data, a distribution of lateral distances between the planned trajectory of the vehicle and a plurality of objects represented in the log data.

Q. The one or more non transitory computer readable media of paragraph O, wherein the second distribution comprises at least one of: a longitudinal position error distribution; a longitudinal stopping distance error distribution; or a longitudinal velocity error distribution, and wherein determining the first distribution comprises determining, based on the log data, a distribution of longitudinal distances between the planned trajectory of the vehicle and a plurality of objects represented in the log data.

R. The one or more non transitory computer readable media of paragraph O, wherein determining the first distribution comprises: determining a predicted perception error rate associated with a perception component of the vehicle; and modifying the first distribution based at least in part on the predicted perception error rate.

S. The one or more non transitory computer readable media of paragraph O, wherein determining the second distribution comprises: determining a vehicle position error associated with a driving maneuver performed by at least one of a test vehicle or a simulated vehicle operating the vehicle component.

T. The one or more non transitory computer readable media of paragraph O, wherein the second distribution is determined based at least in part on a target event rate associated with the autonomous vehicle.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described.

The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
   one or more processors; and
   one or more non-transitory computer-readable media storing computer-executable instructions that, when executed, cause the one or more processors to perform operations comprising:

receiving log data associated with a vehicle operating in an environment, the log data comprising a representation of an object in the environment proximate to the vehicle;

determining, based at least in part on the log data, a first distribution representing a distribution of a distance from the object to a planned trajectory of the vehicle, wherein the first distribution is associated with a driving maneuver performed by the vehicle;

determining a second distribution representing an error distribution of a vehicle component associated with using the vehicle component to perform the driving maneuver associated with the first distribution;

determining, based at least in part on the first distribution and the second distribution, a predicted collision rate associated with performing the driving maneuver using the vehicle component; and transmitting, based at least in part on the predicted collision rate, the vehicle component to an autonomous vehicle to cause the vehicle component to perform a vehicle control operation, wherein the vehicle control operation comprises one or more of: an acceleration control operation, a braking control operation, or a steering maneuver control operation.

2. The system of claim 1, wherein the driving maneuver comprises at least one of:
a stopping driving maneuver;
a turning driving maneuver;
a single lane change driving maneuver; or
a double lane change driving maneuver.

3. The system of claim 2, wherein the driving maneuver further comprises at least one of:
a speed associated with the driving maneuver; or
a driving condition associated with the driving maneuver.

4. The system of claim 1, wherein determining the second distribution comprises:
determining a vehicle position error associated with the driving maneuver performed by at least one of a test vehicle or a simulated vehicle operating the vehicle component.

5. The system of claim 1, wherein the second distribution is determined based at least in part on a target collision rate associated with the autonomous vehicle.

6. A method comprising:
receiving log data associated with a vehicle operating in an environment, the log data comprising a representation of an object in the environment proximate to the vehicle;

determining, based at least in part on the log data, a first distribution representing a distribution of a distance from the object to a planned trajectory of the vehicle, wherein the first distribution is associated with a driving maneuver performed by the vehicle;

determining a second distribution representing an error distribution of a vehicle component associated with using the vehicle component to perform the driving maneuver associated with the first distribution;

determining, based at least in part on the first distribution and the second distribution, a predicted event rate associated with the vehicle component; and transmitting, based at least in part on the predicted event rate, the vehicle component to an autonomous vehicle to cause the vehicle component to perform a vehicle control operation, wherein the vehicle control operation comprises one or more of: an acceleration control operation, a braking control operation, or a steering maneuver control operation.

7. The method of claim 6, wherein the second distribution comprises at least one of:
a lateral position error distribution; or
a heading error distribution, and
wherein determining the first distribution comprises determining, based on the log data, a distribution of lateral distances between the planned trajectory of the vehicle and a plurality of objects represented in the log data.

8. The method of claim 6, wherein the second distribution comprises at least one of:
a longitudinal position error distribution;
a longitudinal stopping distance error distribution; or
a longitudinal velocity error distribution, and
wherein determining the first distribution comprises determining, based on the log data, a distribution of longitudinal distances between the planned trajectory of the vehicle and a plurality of objects represented in the log data.

9. The method of claim 6, wherein determining the first distribution comprises:
determining a predicted perception error rate associated with a perception component of the vehicle; and
modifying the first distribution based at least in part on the predicted perception error rate.

10. The method of claim 6, wherein determining the second distribution comprises:
determining a vehicle position error associated with the driving maneuver performed by at least one of a test vehicle or a simulated vehicle operating the vehicle component.

11. The method of claim 6, wherein the second distribution is determined based at least in part on a target event rate associated with the autonomous vehicle.

12. The method of claim 6, wherein determining the first distribution comprises determining, based on the log data, a distribution of distances between the planned trajectory of the vehicle and a plurality of objects within environments that include a first driving condition.

13. The method of claim 6, wherein the second distribution comprises determining a joint distribution based at least in part on:
a first lateral position error distribution; and
a second longitudinal position error distribution,
and wherein determining the first distribution comprises determining, based on the log data, a distribution of total distances between the planned trajectory of the vehicle and a plurality of objects represented in the log data.

14. The method of claim 6, further comprising:
determining a performance degradation associated with operation of the autonomous vehicle; and
determining vehicle component performance data, based at least in part on the performance degradation and the second distribution,
wherein a trajectory planner component is configured to determine a trajectory for controlling the autonomous vehicle, based at least in part on the vehicle component performance data.

15. One or more non transitory computer readable media storing instructions executable by a processor, wherein the instructions, when executed, cause the processor to perform operations comprising:
receiving log data associated with a vehicle operating in an environment, the log data comprising a representation of an object in the environment proximate to the vehicle;

determining, based at least in part on the log data, a first distribution representing a distribution of a distance from the object to a planned trajectory of the vehicle, wherein the first distribution is associated with a driving maneuver performed by the vehicle;

determining a second distribution representing an error distribution of a vehicle component associated with using the vehicle component to perform the driving maneuver associated with the first distribution;

determining, based at least in part on the first distribution and the second distribution, a predicted event rate associated with the vehicle component; and transmitting, based at least in part on the predicted event rate, the vehicle component to an autonomous vehicle to cause the vehicle component to perform a vehicle control operation, wherein the vehicle control operation comprises one or more of: an acceleration control operation, a braking control operation, or a steering maneuver control operation.

16. The one or more non transitory computer readable media of claim 15, wherein the second distribution comprises at least one of:

a lateral position error distribution; or a heading error distribution, and wherein determining the first distribution comprises determining, based on the log data, a distribution of lateral distances between the planned trajectory of the vehicle and a plurality of objects represented in the log data.

17. The one or more non transitory computer readable media of claim 15, wherein the second distribution comprises at least one of:

a longitudinal position error distribution;

a longitudinal stopping distance error distribution; or a longitudinal velocity error distribution, and wherein determining the first distribution comprises determining, based on the log data, a distribution of longitudinal distances between the planned trajectory of the vehicle and a plurality of objects represented in the log data.

18. The one or more non transitory computer readable media of claim 15, wherein determining the first distribution comprises:

determining a predicted perception error rate associated with a perception component of the vehicle; and modifying the first distribution based at least in part on the predicted perception error rate.

19. The one or more non transitory computer readable media of claim 15, wherein determining the second distribution comprises:

determining a vehicle position error associated with the driving maneuver performed by at least one of a test vehicle or a simulated vehicle operating the vehicle component.

20. The one or more non transitory computer readable media of claim 15, wherein the second distribution is determined based at least in part on a target event rate associated with the autonomous vehicle.

* * * * *